(12) United States Patent
Blackwell

(10) Patent No.: US 12,544,139 B2
(45) Date of Patent: Feb. 10, 2026

(54) SYSTEM AND METHOD FOR LIGAMENT BALANCING AND RANGE OF MOTION TENSOR FOR SAME

(71) Applicant: GLOBUS MEDICAL, INC., Audubon, PA (US)

(72) Inventor: Timothy J. Blackwell, Ft. Pierce, FL (US)

(73) Assignee: Globus Medical, Inc., Audubon, PA (US)

( * ) Notice: Subject to any disclaimer, the term of this patent is extended or adjusted under 35 U.S.C. 154(b) by 250 days.

(21) Appl. No.: 18/342,776

(22) Filed: Jun. 28, 2023

(65) Prior Publication Data

US 2025/0000584 A1    Jan. 2, 2025

(51) Int. Cl.
*A61B 17/17* (2006.01)
*A61B 17/90* (2006.01)
*A61B 34/10* (2016.01)
*A61B 34/20* (2016.01)

(52) U.S. Cl.
CPC .............. *A61B 34/10* (2016.02); *A61B 17/90* (2021.08); *A61B 34/20* (2016.02); *A61B 2034/102* (2016.02); *A61B 2034/105* (2016.02); *A61B 2034/107* (2016.02); *A61B 2034/108* (2016.02); *A61B 2034/2055* (2016.02); *A61B 2034/2072* (2016.02)

(58) Field of Classification Search
CPC .... A61B 17/17; A61B 17/1764; A61B 17/157
See application file for complete search history.

(56) References Cited

U.S. PATENT DOCUMENTS

2017/0333220 A1\* 11/2017 Reeve .................. A61F 2/4684

\* cited by examiner

*Primary Examiner* — Samuel S Hanna

(57) ABSTRACT

A system for ligament balancing including a range-of-motion (ROM) tensor. The ROM tensor of the system includes a main body, first and second arms, a pin guide and a pin. The main body has an elongate guide. The first and second arms are rigidly attached to and extends laterally from the main body and configured to be placed over an uncut tibia and below an uncut femur. The pin guide is slidably coupled to the elongate guide and has a through-hole for receiving the pin. The ROM tensor is designed to pivot about the pin while the tibia moves through its range of motion while the femur preferably remains stationary. A navigation system monitors the position of the tibia and femur as the tibia moves and the gap information derived from the position monitoring is displayed on a display device.

20 Claims, 27 Drawing Sheets

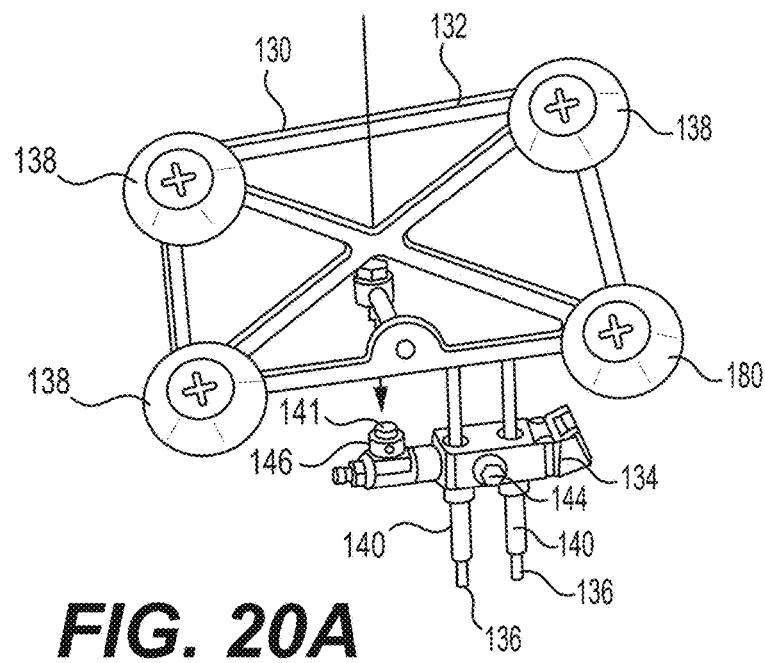
FIG. 20A
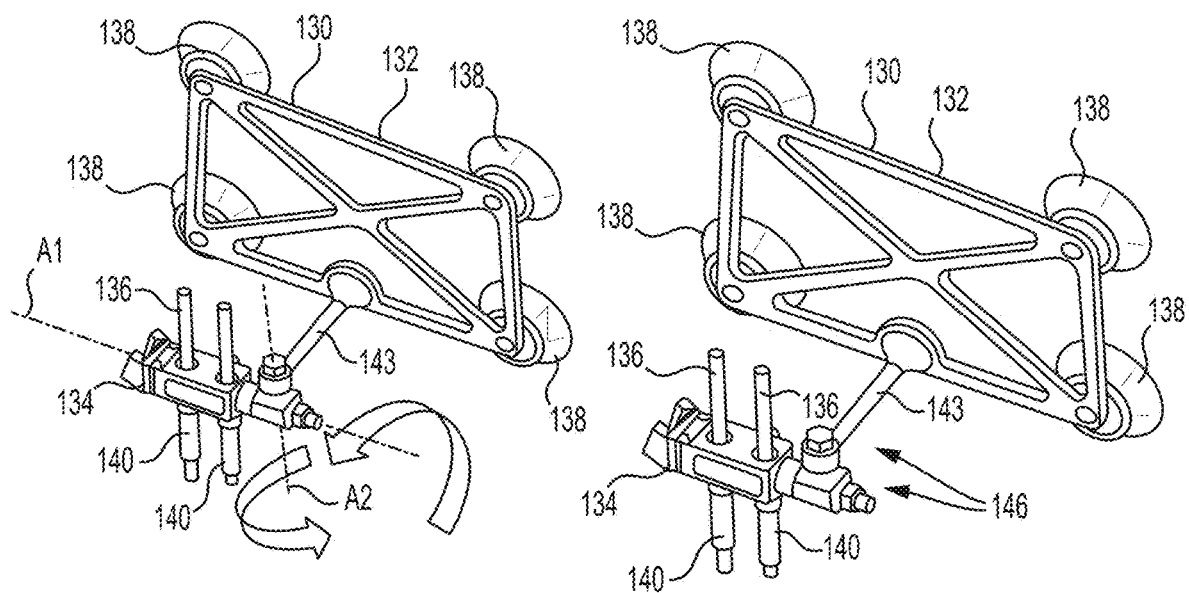
FIG. 20B  FIG. 20C

SYSTEM AND METHOD FOR LIGAMENT BALANCING AND RANGE OF MOTION TENSOR FOR SAME

FIELD OF THE INVENTION

The present disclosure relates to medical devices and systems, and more particularly, to system and method for ligament balancing for total knee arthroplasty surgical procedures.

BACKGROUND OF THE INVENTION

There are a number of surgical interventions requiring osteotomy, e.g., cutting an anatomical structure, such as a bone, along a target plane. A total knee arthroplasty (TKA) may involve cutting both the femoral epiphysis and tibial epiphysis to remove the damaged bone and cartilage and allow for installation of a knee prosthesis.

Currently in TKA surgeries, the patient satisfaction rate may only be about 80%. This is low in comparison to some other types of orthopedic surgeries, such as for hip arthroplasty where patient satisfaction is typically about 95%. These satisfaction rates have remained principally unchanged over several decades despite innovations in new implant designs, custom cutting template solutions, customized implants, and the like. This suggests that there may be problems with TKA and other orthopedic surgeries that have not been addressed by previous medical procedures and related innovations.

Computer-assisted surgery (CAS) including navigation and/or robotic surgical systems may utilize position recognition systems, which determine the position of and track a particular object in 3-dimensions (3D). There is a need to provide an improved system and method for ligament balancing which relies on navigation systems.

SUMMARY OF THE INVENTION

According to one aspect of the present invention, a system for ligament balancing including a range-of-motion (ROM) tensor is provided. The ROM tensor of the system includes a main body, first and second arms, a pin guide and a pin.

The main body has an elongate guide. The first and second arms are rigidly attached to and extends laterally from the main body and configured to be placed over an uncut tibia and below a femur. The pin guide is slidably coupled to the elongate guide and has a through-hole for receiving the pin. The ROM tensor is designed to pivot about the pin while the tibia goes through its range of motion. A navigation system monitors the position of the tibia and femur as the tibia moves and gap information derived from the position monitoring.

In another aspect of the present invention, a work flow for using the ligament balancing system includes accessing a joint; registering an anatomy of the patient, registering a drill having a tracker array, inserting a ROM Tensor, moving the tibia through the ROM, and virtually planning an implant placement to fill the gap.

Advantageously, the present invention requires no bone cuts to perform the tensioning and by keeping the femur stationary and only moving the tibia, rotation of bones to balance soft tissues is shared between the femur and the tibia. In extension, the tibia is free to swivel medial or lateral to balance the ligament loads. In flexion, the rotation of the femur and tibia share the balancing loads.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein:

FIGS. 20A-20C depict the dynamic reference base with the handle removed, attaching the reference array, adjusting the position and/or orientation of the reference array, and locking the final position of the reference array;

DETAILED DESCRIPTION OF THE INVENTION

During a knee replacement, knee arthroplasty, or total knee arthroplasty (TKA), one or more implants may be used to cap the ends of the femur and/or tibia that form the knee joint. The knee includes the femur or thighbone of the upper leg, the tibia or shin bone of the lower leg, and the patella or knee cap. A TKA may be desirable when osteoarthritis cause breakdown of joint cartilage and/or one or more bones in the knee, rheumatoid arthritis causes inflammation of the synovial membrane, or trauma causes damage to the bone and/or cartilage of the knee. Although a TKA is exemplified herein, it will be appreciated that other orthopedic or other surgical procedures may utilize the devices and systems described herein. In order to improve surgical outcomes, a surgical navigation and/or robotic system may be used to navigate one or more instruments and/or assist the surgeon with one or more surgical procedures.

Figure 1:
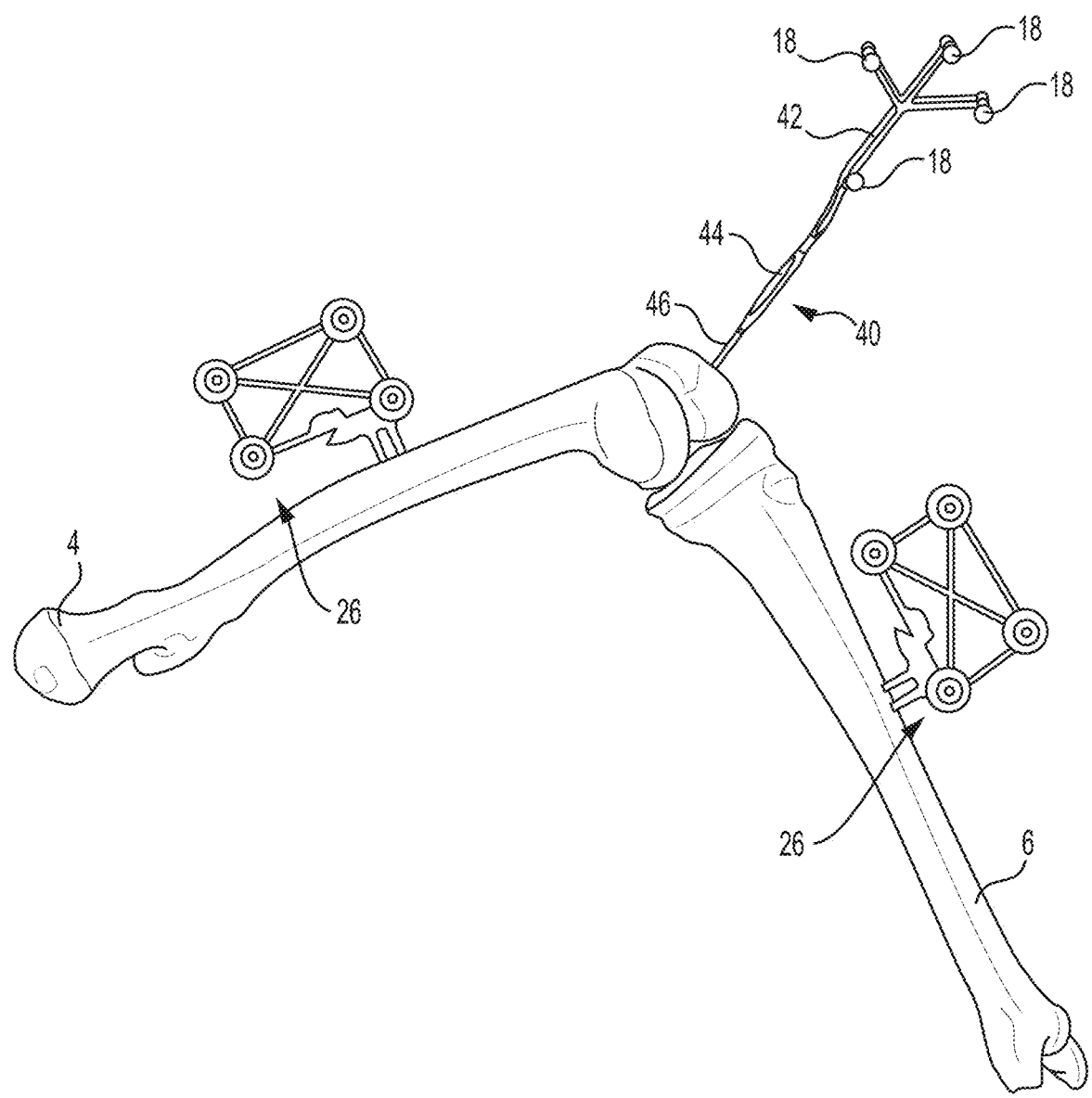
FIG. 1 shows a femur and tibia with a dynamic reference base attached to each bone and a stylus with a universal reference element according to one embodiment.
Figure 2:
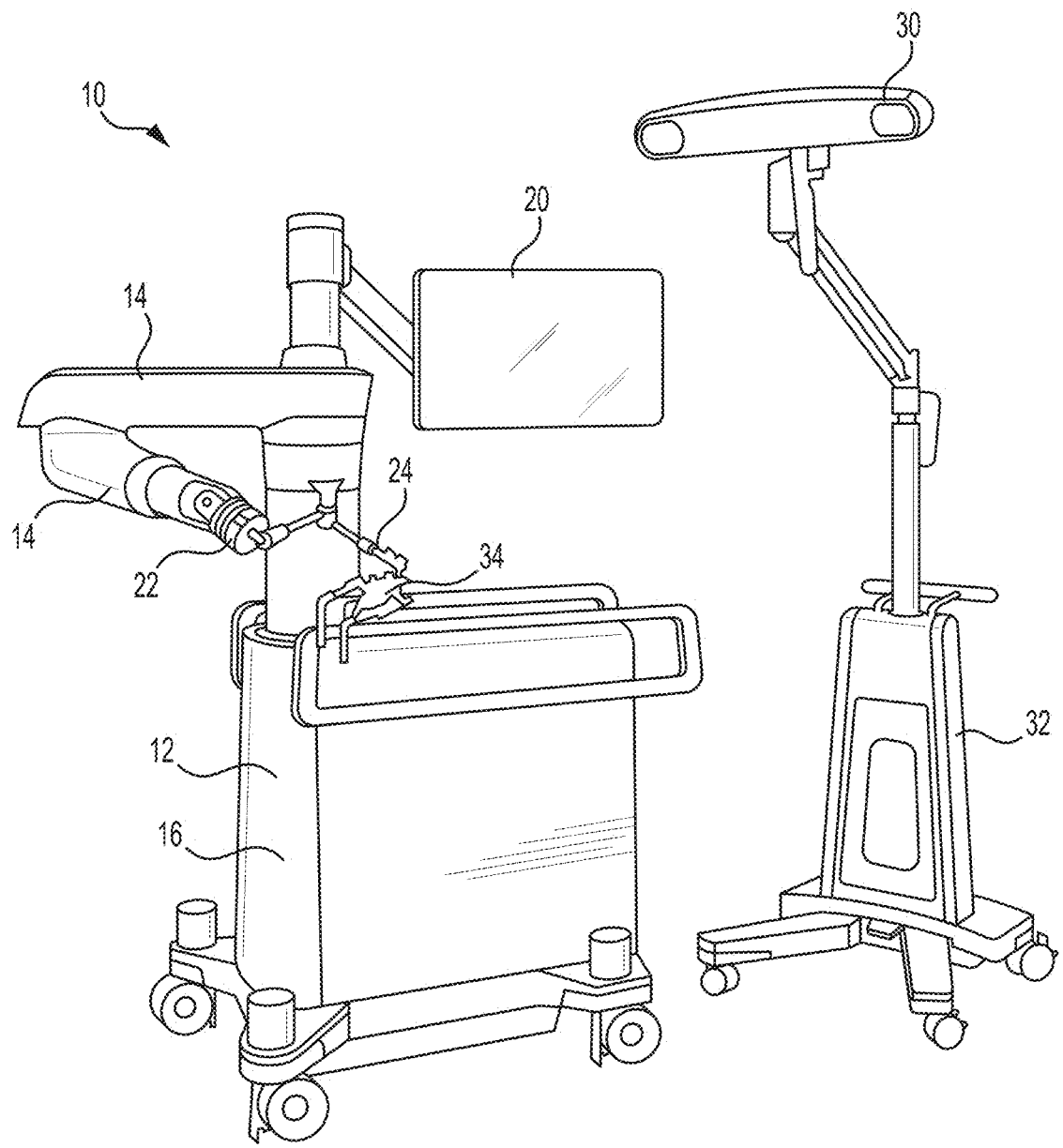
FIG. 2 illustrates a surgical robotic and/or navigation system in accordance with one embodiment.
Figure 3:
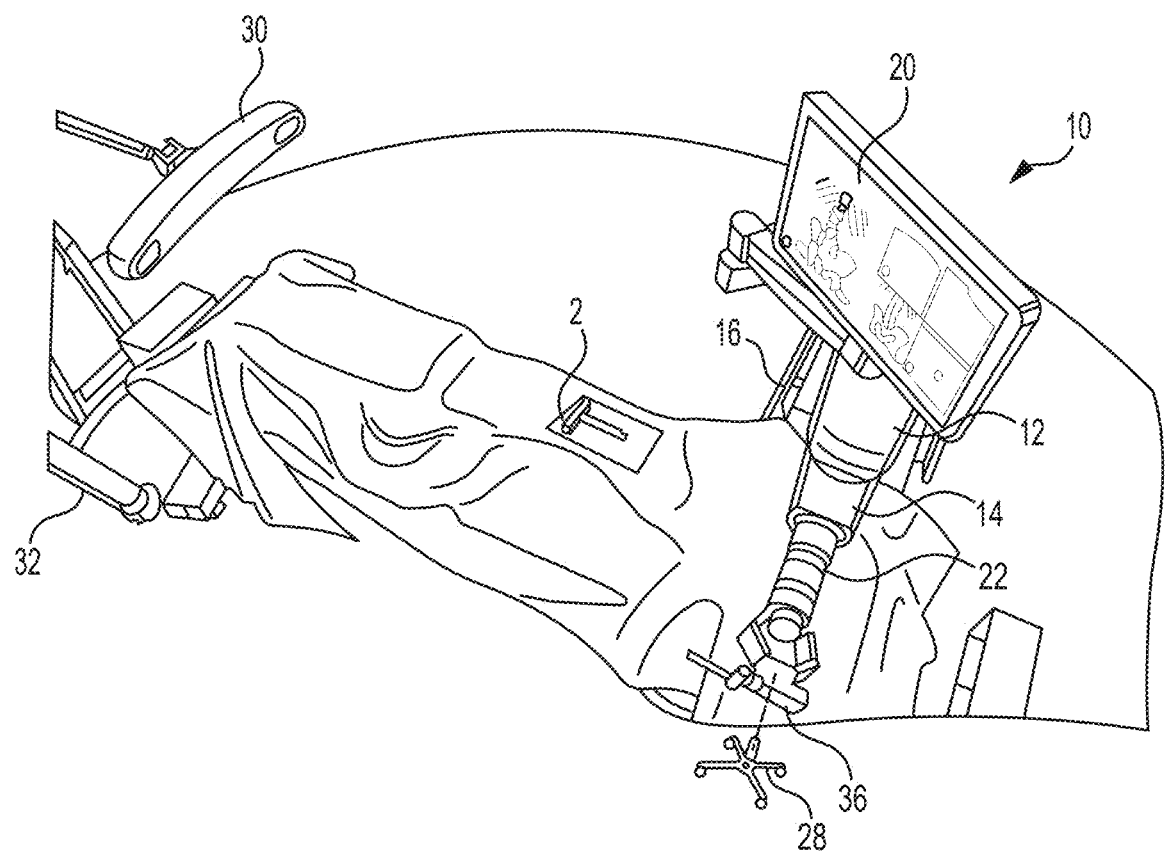
FIG. 3 illustrates a medical operation in which the surgical robot and camera system are positioned around a patient.

Referring now to FIG. 1, a system or procedure for conducting one or more steps in a knee arthroplasty is shown. The femur 4 and tibia 6 are shown with a patient tracking device or dynamic reference base 26 attached to each bone. The dynamic reference base 26 tracks the patient's anatomy throughout the course of the operation. The dynamic reference base 26 may be configured to be tracked by a surgical robot and/or navigation system 10, for example, as shown in FIG. 2. The surgical robot and/or navigation system 10 may include, for example, a surgical robot 12, one or more robot arms 14, a base 16 including a computer platform, a display or monitor 20 (and/or optional wireless tablet, headset, etc.), an end-effector 22, and one or more tracking markers 18. The end effector 22 may be configured to secure a guide tube, access instrument, or other tool suitable for performing one or more steps in the orthopedic procedure. In one embodiment shown in FIG. 2, an access instrument 34 (e.g., a retractor) is attached to the end-effector 22 with an articulating arm 24, and in an alternative embodiment shown in FIG. 3, an instrument holder for securing a surgical saw 36, for example, configured to oscillate a saw blade for cutting bone, is coupled to the end-effector 22. It will be appreciated that a suitable instrument or device may be connected to the end-effector 22 for control by robot 12.

In navigated and/or robot-assisted surgical procedures, one or more instruments may be tracked using a reference element, array, or dynamic reference array 28, 42, 94. The reference array 28, 42, 94 may include one or tracking markers 18, which are attached or attachable to the instrument and allow for the tracking system 10 to detect and localize the position of the instrument in 3D space. The computer platform in combination with the camera tracking system or other 3D localization system are configured to track in real-time the pose (e.g., positions and rotational orientations) of the reference arrays 28, 42, 94. The tracking of 3D coordinates of the reference array 28, 42, 94 may allow the surgical system 10 to determine the pose of the reference array 28, 42, 94 in any multidimensional space in relation to the target anatomical structure of the patient 2.

The surgical robot system 10 may include one or more patient tracking devices or dynamic reference bases 26, 130 including one or more tracking markers 18, which are adapted to be secured directly to the patient 2 (e.g., to the bone of the patient 2). In the embodiment shown in FIG. 1, a first patient tracking device or first dynamic reference base 26 is secured to the femur 4 and a second patient tracking device or second dynamic reference base 26 is secure to the tibia 6 of the patient 2. In this manner, the system 10 is able to track the femur 4 and tibia 6 throughout the surgical operation.

The surgical robot system 10 may also utilize a camera 30, for example, positioned on a camera stand 32. The camera stand 32 can have any suitable configuration to move, orient, and support the camera 30 in a desired position. The camera 30 may include any suitable camera or cameras, such as one or more infrared cameras (e.g., bifocal or stereophotogrammetric cameras), able to identify, for example, active and/or passive tracking markers 18 in a given measurement volume viewable from the perspective of the camera 30. The camera 30 may scan the given measurement volume and detect the light that comes from the markers 18 in order to identify and determine the position of the markers 18 in three-dimensions. For example, active markers 18 may include infrared-emitting markers that are activated by an electrical signal (e.g., infrared light emitting diodes (LEDs)), and passive markers 18 may include retro-reflective markers that reflect infrared light (e.g., they reflect incoming IR radiation into the direction of the incoming light), for example, emitted by illuminators on the camera 30 or other suitable device.

The surgical robot 12 is able to control the translation and orientation of the end-effector 22. The robot 10 may be able to move end-effector 22 along x-, y-, and z-axes, for example. The end-effector 22 can be configured for selective rotation about one or more of the x, y-, and z-axis, and a Z Frame axis (such that one or more of the Euler Angles (e.g., roll, pitch, and/or yaw) associated with end-effector 22 can be selectively controlled). In some exemplary embodiments, selective control of the translation and orientation of end-effector 22 can permit performance of medical procedures with significantly improved accuracy.

The robotic positioning system 12 includes one or more computer controlled robotic arms 14 to assist surgeons in planning the position of one or more instruments relative to pre-operative and/or intraoperative patient images. The system 10 may include 2D & 3D imaging software that allows for preoperative planning, navigation, and guidance through dynamic reference arrays, navigated instruments and camera for the placement of instruments, orthopedic devices, or other devices. Further details of surgical robotic and/or navigation systems can be found, for example, in U.S. Pat. No. 8,257,360, U.S. patent publication No. 2019/0021795, and U.S. patent publication No. 2017/0239007, which are all incorporated herein by reference in their entireties for all purposes.

Figure 4A:
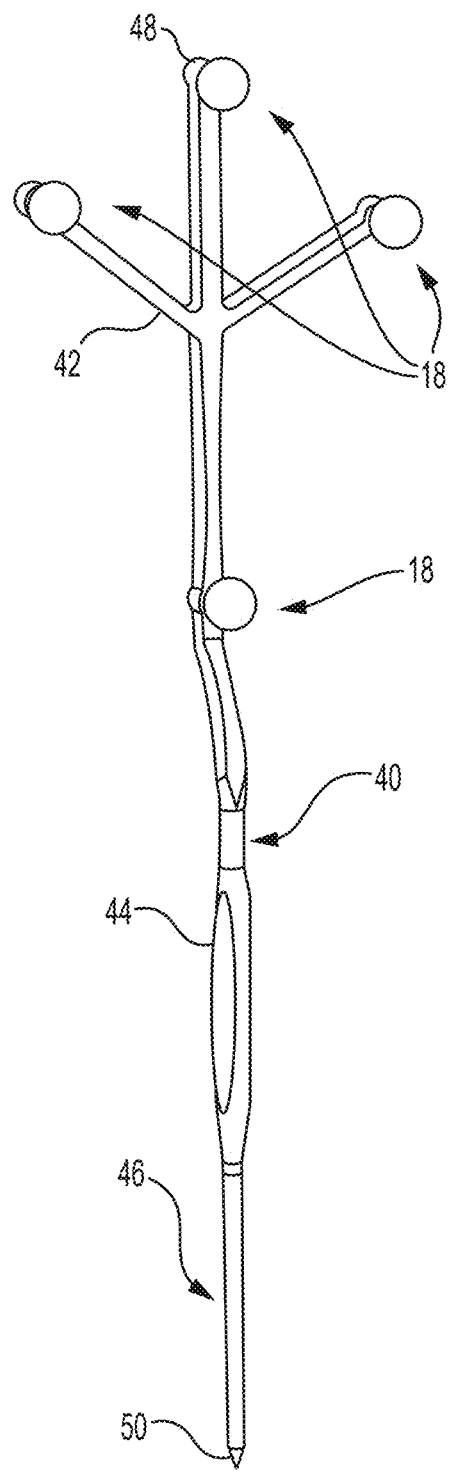
FIGS. 4A-4C illustrate embodiments of a stylus with a universal reference element, a plane checker instrument attached to the stylus, and a posterior tibial wall hook attached to the stylus.
Figure 4B:
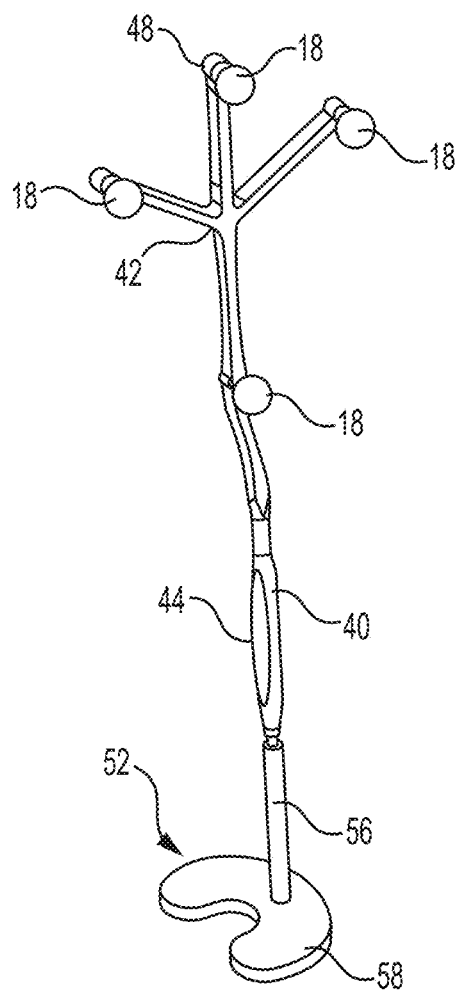
Figure 4C:
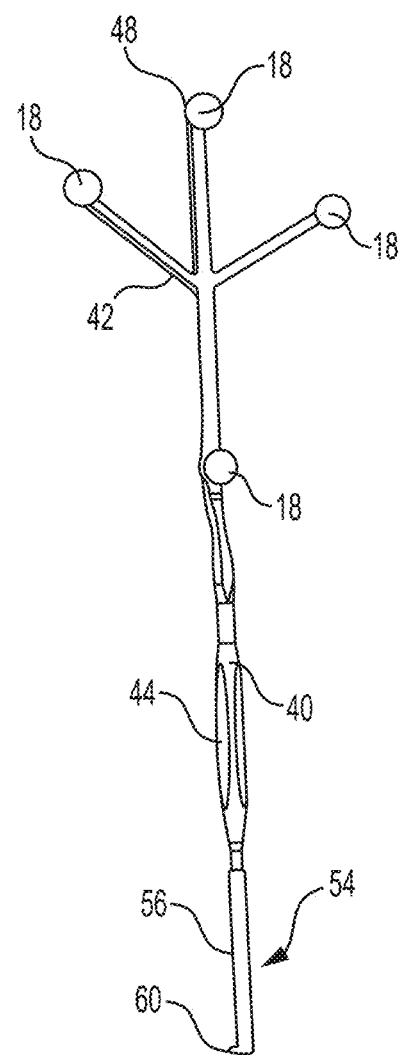

Turning now to FIGS. 4A-4C, embodiments of a universal stylus instrument or stylus 40 is shown. In navigated and/or robot-assisted surgical procedures, it may be common for several instruments to be tracked. If the user wishes to track different instruments, several different reference elements or arrays may be used with each having a different configuration. These unique configurations communicate to the navigation system 10 that a new instrument is being used and redefine its location in 3D space. Thus, in order to track many instruments, many corresponding reference elements are needed, which adds to the cost and complexity as the user is constantly reaching for and configuring different reference elements.

According to one embodiment, the stylus 40 is used as a universal reference element. The stylus 40 may be plugged into several different instruments to make each navigable, thereby eliminating the need for many different reference elements. As best seen in FIG. 4A, the stylus 40 may include an array 42 with a plurality of markers 18 at a proximal end 48, an elongate body 44, and a universal quick-connect attachment tip 46 at a distal end 50. The universal attachment tip 46 is configured to quickly attach the stylus 40 to one or more instruments and return their position to the navigation system 10. For example, in TKA, the stylus 40 may be used to navigate itself, an attached plane checker 52, an attached posterior tibial wall hook 54, or any other suitable instruments. The tracking markers 18 on the array 42 of the stylus 40 are viewable by the navigation system 10 and return the location of the stylus tip 46 and any attached instruments.

The universal stylus 40 may be used alone or with attached instruments (e.g., posterior tibial wall hook 54 or plane checker 52). A mechanical connection of the universal stylus 40 to the instruments 52, 54 may allow for the functional length between the navigated tip 46 of the instrument (e.g., measurement surfaces of the hook 54 or plane checker 52) and pattern of the stylus reference array 42 to be controlled with a high level of repeatability. The universal tip 46 may act as a quick connect mechanism for fast attachment of the instrument by the user.

In one embodiment shown in FIG. 4B, a plane checker 52 is attached to the stylus 40. The universal attachment tip 46 may be inserted into and secured to the plane checker 52. The plane checker 52 may include a collar 56 and a foot 58. The collar 56 may include a longitudinal opening configured to receive the universal tip 46 of the stylus 40. The universal attachment tip 46 of the stylus 40 may be sized such that it forms a clearance fit with the opening in the collar 56. If desired, a spring preloaded mechanism may be positioned in the opening such that it preloads the connected parts to a reference surface. The plane checker 52 may be free to rotate relative to the stylus 40. Free rotation of the plane checker 52 around the longitudinal axis A of the stylus 40 may allow the user to quickly reorient the reference array 42, for example, to ensure line of sight to the camera 30. Although a clearance fit is described, any suitable connection between the tip 46 and plane checker 52 may be used to temporarily secure the components together. The foot 58 may include a U-shaped plate or other suitably shaped plate. The foot 58 may include a flat bottom surface or flat portion configured to contact a resection surface on the bone. When used during a TKA procedure, the plane checker 52 may be used to ensure that the angulation and/or location of the resection plans matches the plane.

In another embodiment shown in FIG. 4C, a posterior tibial wall hook 54 is attached to the stylus 40. The universal attachment tip 46 may be inserted into and coupled to the posterior tibial wall hook 54. The universal attachment tip 46 of the stylus 40 may be sized such that it forms a location fit with the opening in the collar 56. A static fit may allow for a fixed position and orientation of the posterior tibial wall hook 54 with respect to the stylus array 42. Although a static fit is described, any suitable connection between the tip 46 and wall hook 54 may be used to temporarily secure the components together. The wall hook 54 may include collar 56 with an enlarged tip or hook 60 at its distal-most end. When used during a TKA procedure, the posterior tibial wall hook 54 may be used to localize the tibial wall.

Figure 5A:
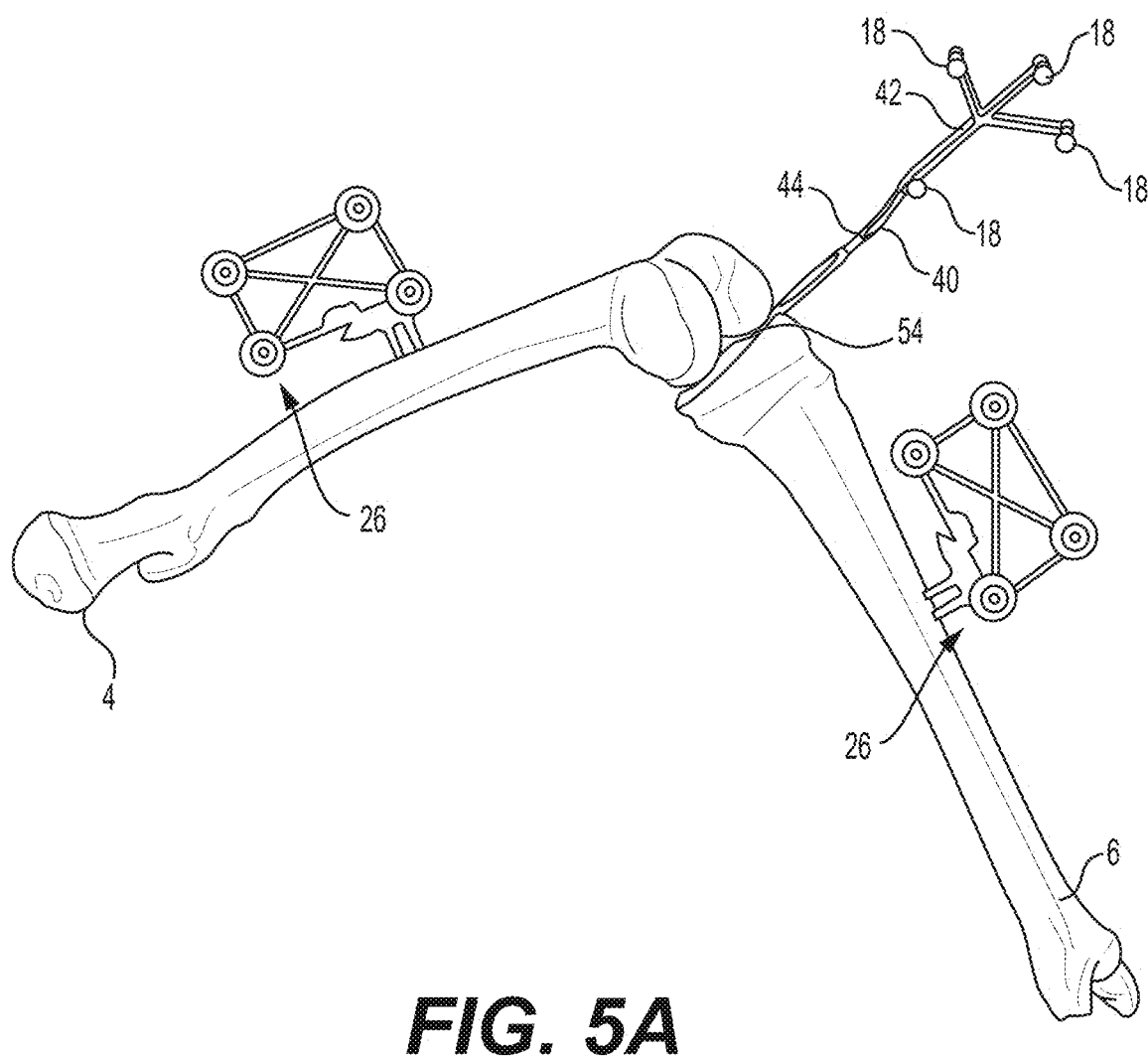
FIGS. 5A-5B show uses for the stylus with the tibia wall hook and plane checker attachment, respectively.
Figure 5B:
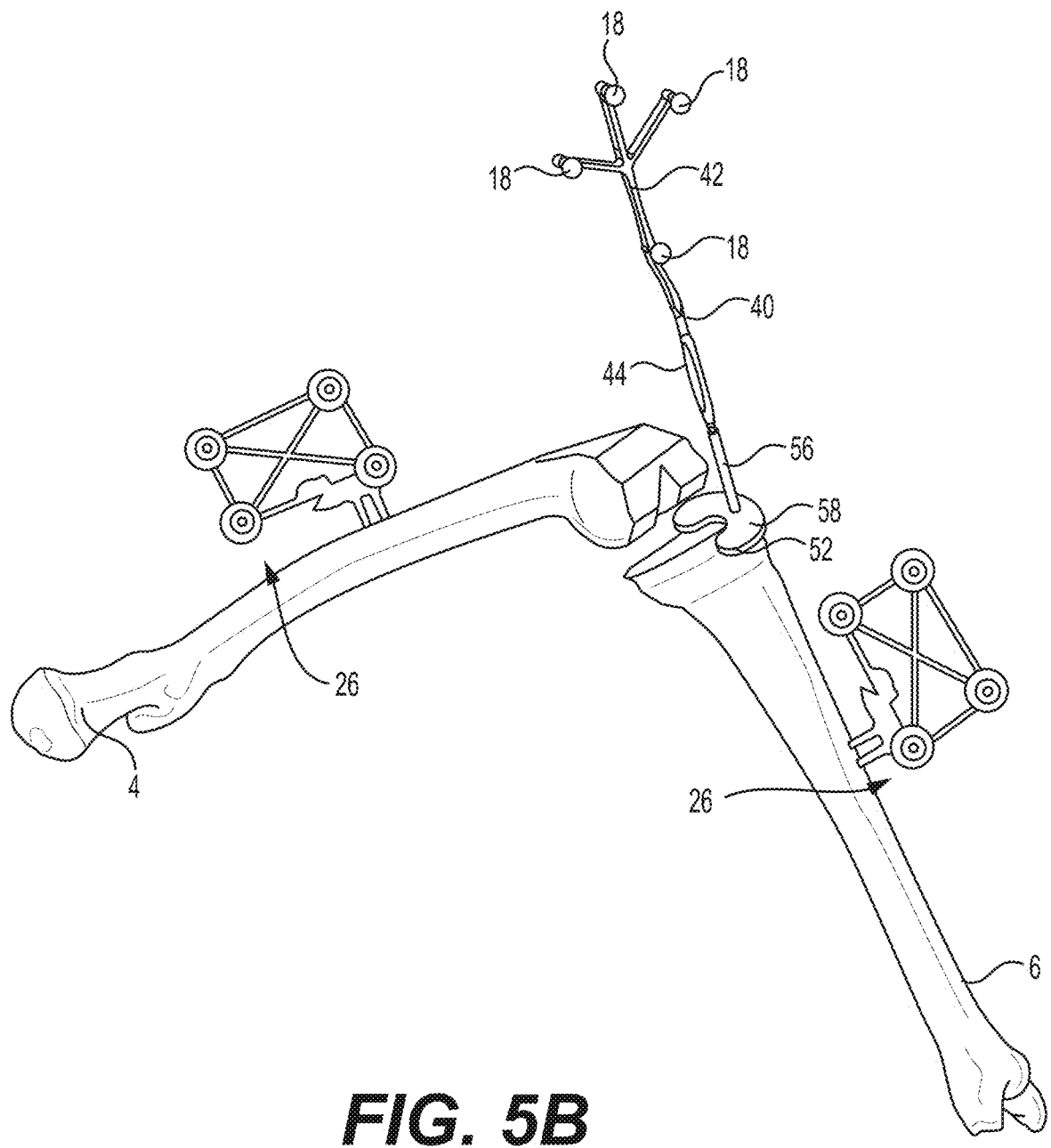

As shown in FIG. 1, the stylus 40 may be used alone. In this case, the dynamic reference bases 26 are tracking the patient anatomy of the femur 4 and tibia 6. The stylus 40 may be used for tasks such as landmark checks or characteristic bone surface acquisition including condyles or tibial plateau. In FIG. 5A, the tibial wall hook 54 has been attached to the distal end 50 of the stylus 40 via the attachment tip 46. When attached to the stylus 40, the hook 54 may be navigated via the stylus tracking array 42 and the user may perform acquisition of points to define the posterior tibial wall, for example. In FIG. 5B, the user may check the angulation and/or location of the resected planes using the attached plane checker 52. The plane checker 52 is attached to the universal tip 46 of the stylus 40, and the stylus 40 acts as a universal reference element for the plane checker 52. The resection planes determined by the plane checker 52 may be returned to the user via the navigation system 10.

Figure 6:
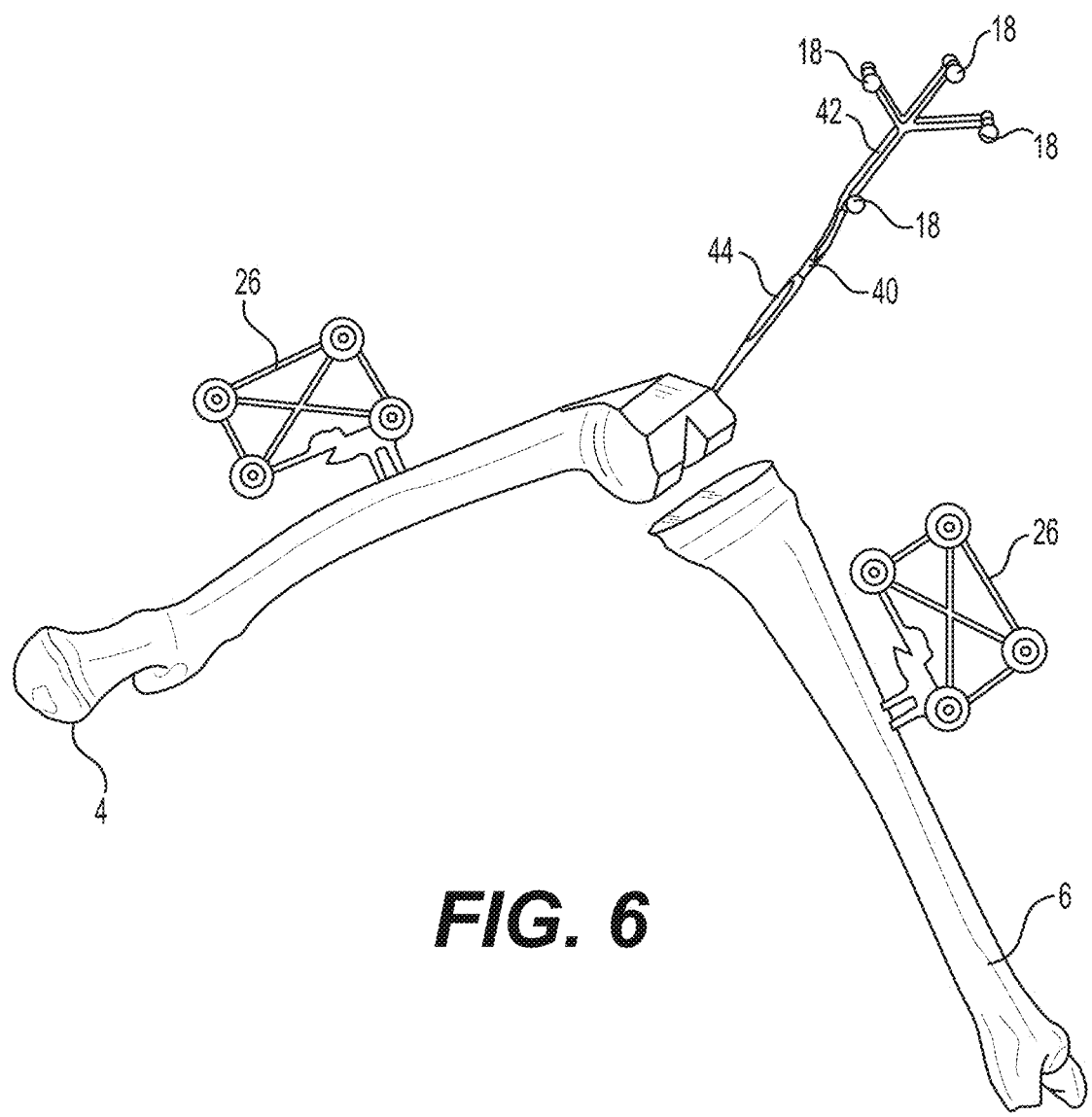
FIG. 6 shows a resected femur and resected tibia and a stylus according to one embodiment.

Turning now to FIG. 6, a resected femur 4 and tibia 6 are shown for a registered patient during a TKA procedure. As shown in FIG. 1, the patient has dynamic reference bases 26 inserted into the tibia 6 and femur 4 and after registration is complete, the stylus 40 may be used to perform landmark checks and establish confidence in the navigational integrity. As can be seen in FIG. 6, however, landmark checks are significantly more challenging post resection as most of the unique bony anatomy has been resected. In robotic and navigated TKA, it is important for the surgeon to have confidence that the patient's anatomy has been accurately registered to the system 10 and that the accuracy is maintained throughout the course of the operation. Navigational integrity may be used to describe this confidence. Specifically, in TKA, navigational integrity may be challenging to maintain throughout the course of the procedure due to the primary anatomical landmarks that the surgeon may use as reference points being resected during the operation.

Accordingly, one or more embodiments described herein provide for the user to perform physical landmark checks even after bony resection removes natural landmarks. One or more embodiments described herein provide for surveillance of the dynamic reference base 26 to ensure that any relative motion to the dynamic reference base 26 is identified and/or recorded. These techniques serve to increase the user's ability to establish and maintain confidence in the system navigational integrity.

Figure 7A:
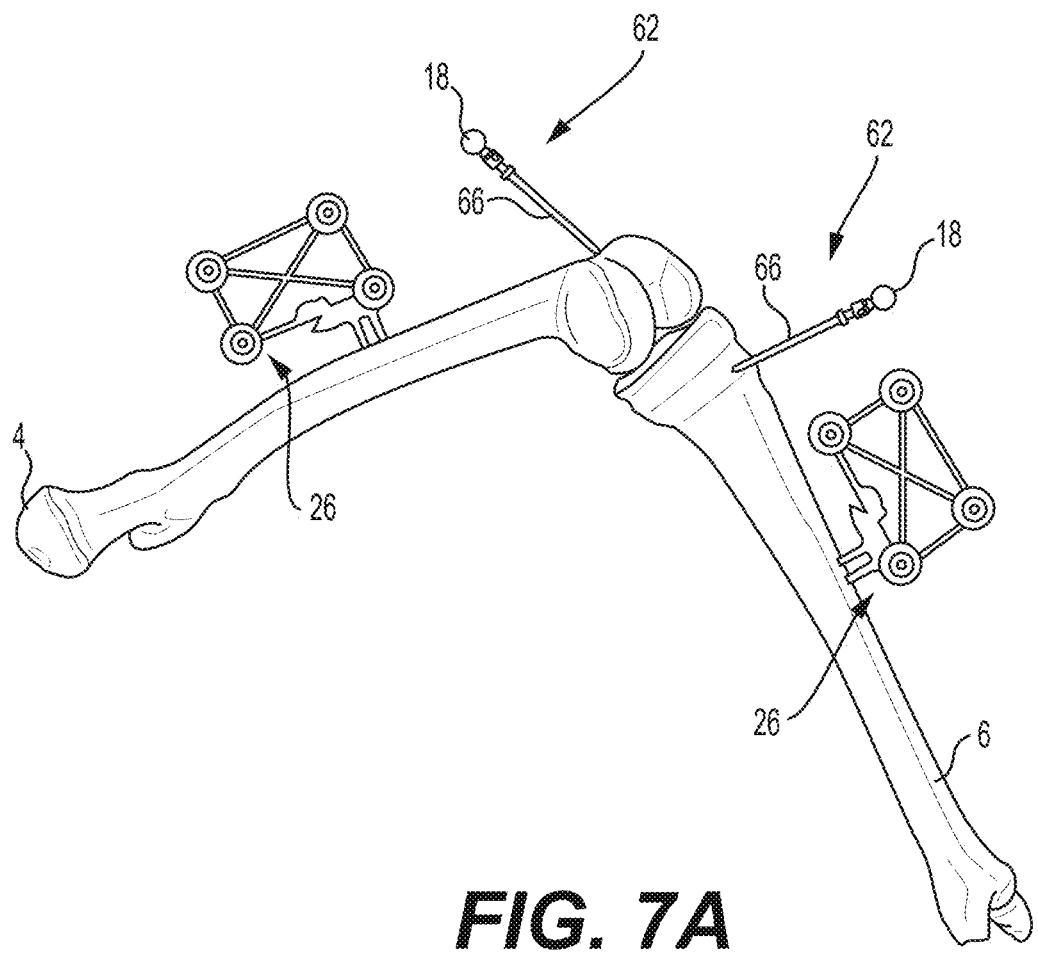
FIGS. 7A-7B illustrate embodiments of one or more surveillance markers that may be used to maintain navigation integrity.
Figure 7B:
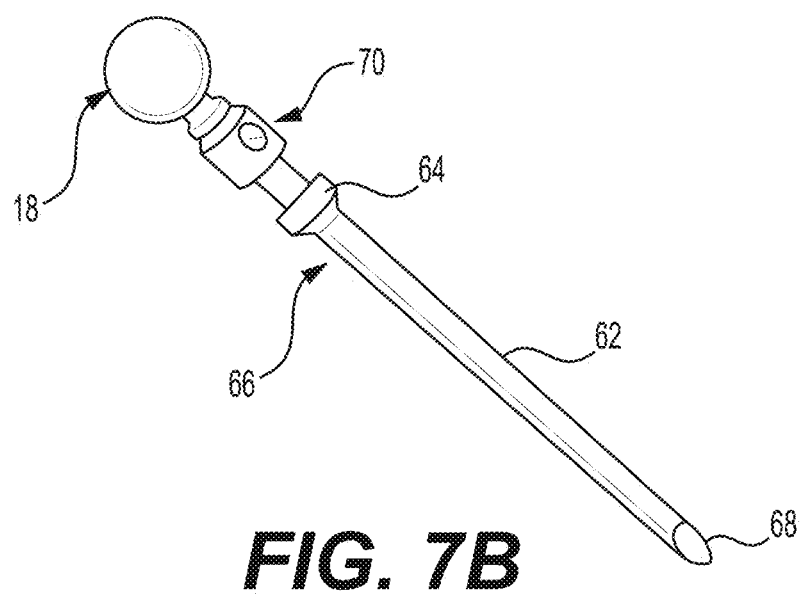

With emphasis on FIGS. 7A-7B, according to one embodiment, one or more surveillance markers 62 may be used to maintain navigational integrity throughout the procedure. For example, a patient registration may include the addition of a first surveillance markers 62 in the femur 4 and a second surveillance marker 62 in the tibia 6 in areas that will not be resected during the procedure. As shown in FIG. 7B, the surveillance marker 62 may include a body 64 including a fastener 66 terminating at a distal tip 68, a verification divot 70, and a tracking marker 18. The fastener 66 may include a bone pin, screw, or anchor, which is inserted into the patient's bony anatomy. The distal tip 68 may be pointed, sharp, or otherwise configured to engage bone. The verification divot 70 may be integrated into the body 64 of the surveillance marker 62. A single tracking marker 18 may be attached to the top of the marker 62, for example, near the verification divot 70.

Figure 8:
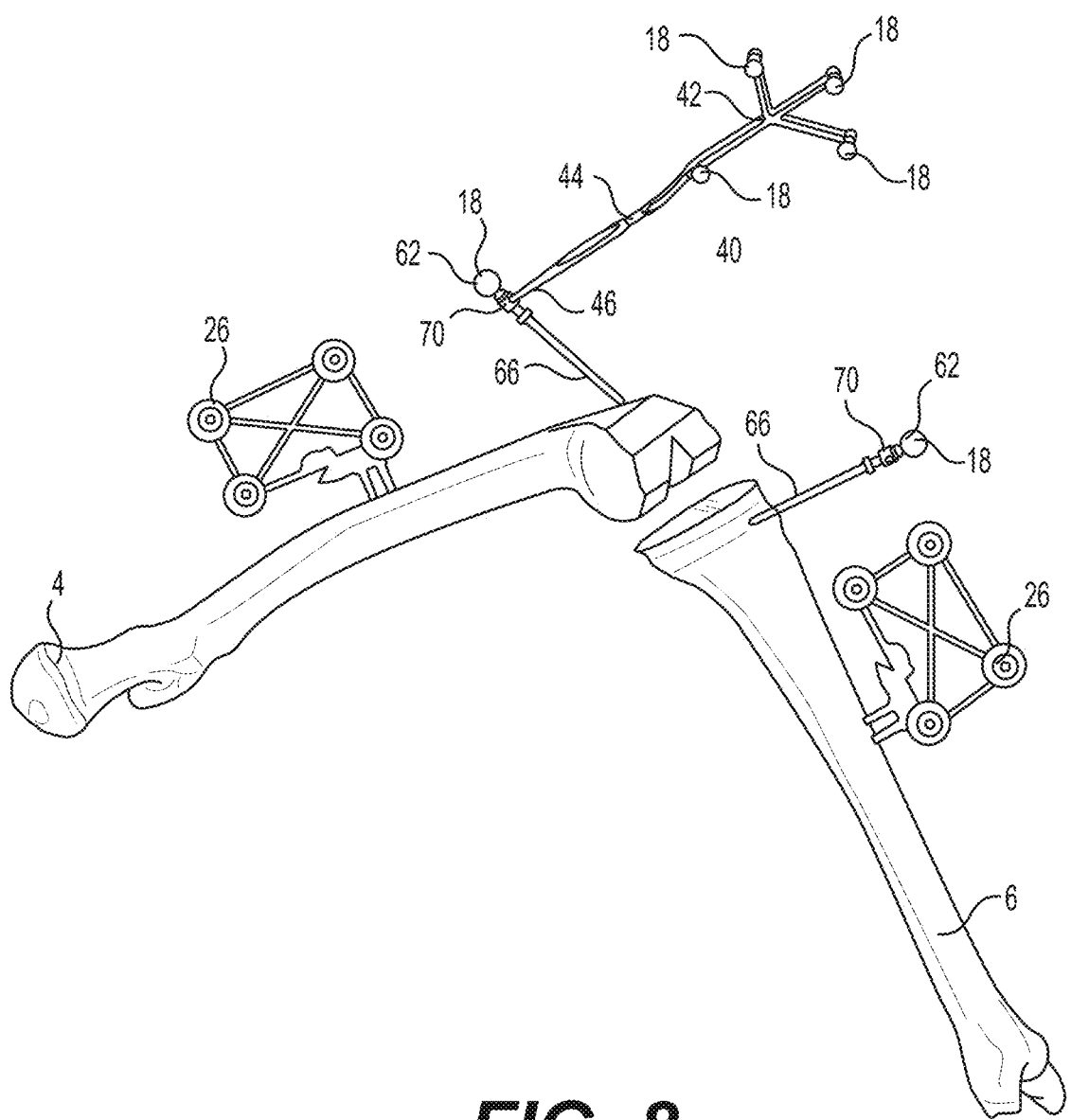
FIG. 8 is an example of a landmark check using the surveillance marker and a stylus.

Once inserted into the patient, the location of the surveillance marker 62 may be registered relative to the dynamic reference base 26. The registration stores the virtual distance between the surveillance marker 62 and the dynamic reference base 26. If the dynamic reference base 26 moves (for example, if it was bumped by the user), the system 10 measures the distance and alerts the user when a movement threshold, for example, 2 mm is exceeded. If the user would like to verify or re-establish the navigational integrity, an additional landmark check may be conducted using the verification divot 66 in the surveillance marker 62 as shown in FIG. 8. For example, the tip 46 of the stylus 40 may be inserted into the verification divot 70 of the surveillance marker 62, thereby confirming navigational integrity.

Figure 9A:
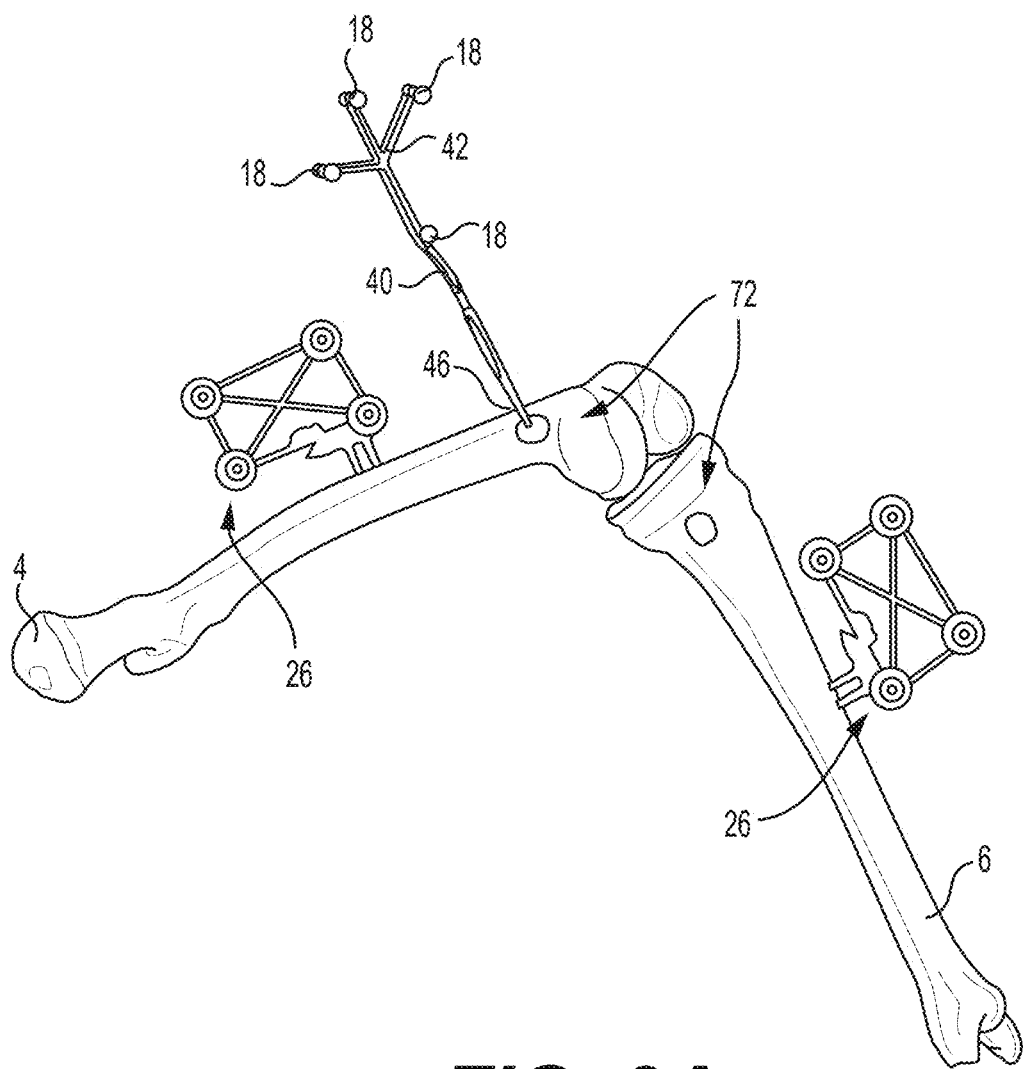
FIGS. 9A-9B illustrate embodiments of one or more virtual landmarks using a stylus.
Figure 9B:
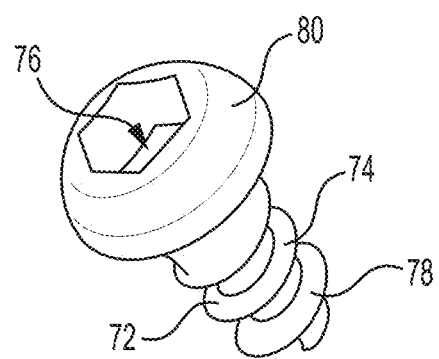

In an alternative embodiment shown in FIGS. 9A-9B, the surveillance marker(s) may be replaced with one or more virtual landmarks 72 in order to maintain navigational integrity throughout the procedure. For example, a first virtual landmark 72 may be positioned in the femur 4 and a second virtual landmark 72 may be positioned in the tibia 6 in areas that will not be resected. The virtual landmark 72 may include a fastener 74, such as a cortical bone screw, with a verification divot 76, for example, nested in the drive feature of the screw. The fastener 74 may include a threaded shaft 78 and an enlarged head 80. As shown in FIG. 9A, the virtual landmarks 72 may be inserted into the patient's bony anatomy at the start of the procedure and the location returned to the system 10 using the stylus 40. If the user would like to perform an intraoperative landmark check at any time (including after resection), the user simply inserts the distal tip 46 of the stylus 40 into the divot 76 of the virtual landmark 72.

Figure 10:
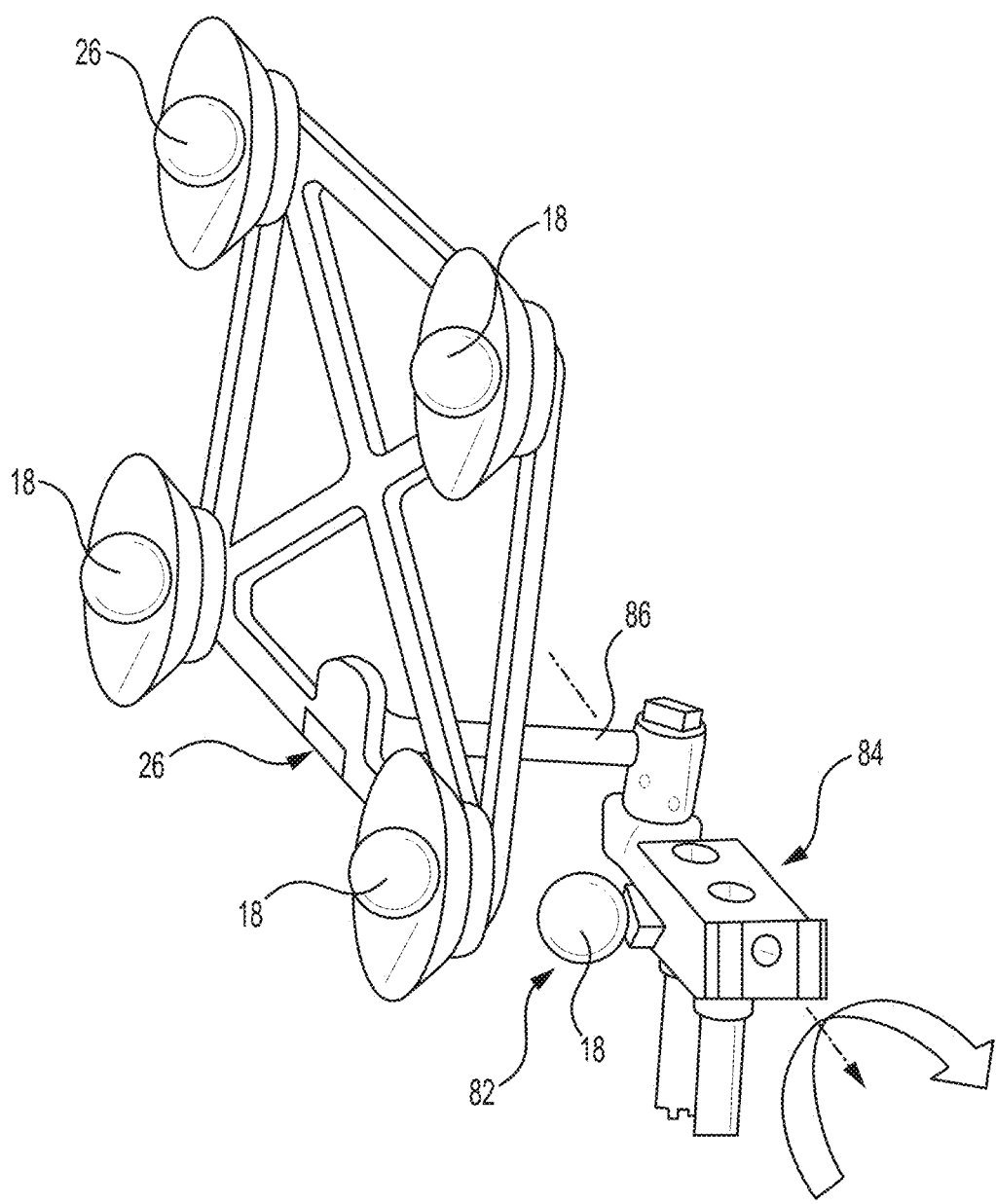
FIG. 10 is an embodiment of a dynamic reference base with an integrated surveillance marker.

In an alternative embodiment shown in FIG. 10, a surveillance marker 82 may be integrated into the dynamic reference base 26 in order to maintain navigational integrity throughout the procedure. The surveillance marker 82 may be affixed the dynamic reference base 26 with a bridge 84 and one or more arms 86. The surveillance marker 82 may be affixed to the bridge 84, for example. The distance between the reference element of the dynamic reference base 26 and the surveillance marker 82 is stored by the system 10. If the dynamic reference base 26 and/or surveillance marker 82 is bumped and/or rotated about the axis indicated, the change in distance and/or movement would be identified and recorded by the system 10 and the user immediately alerted to the disruption.

Figure 11A:
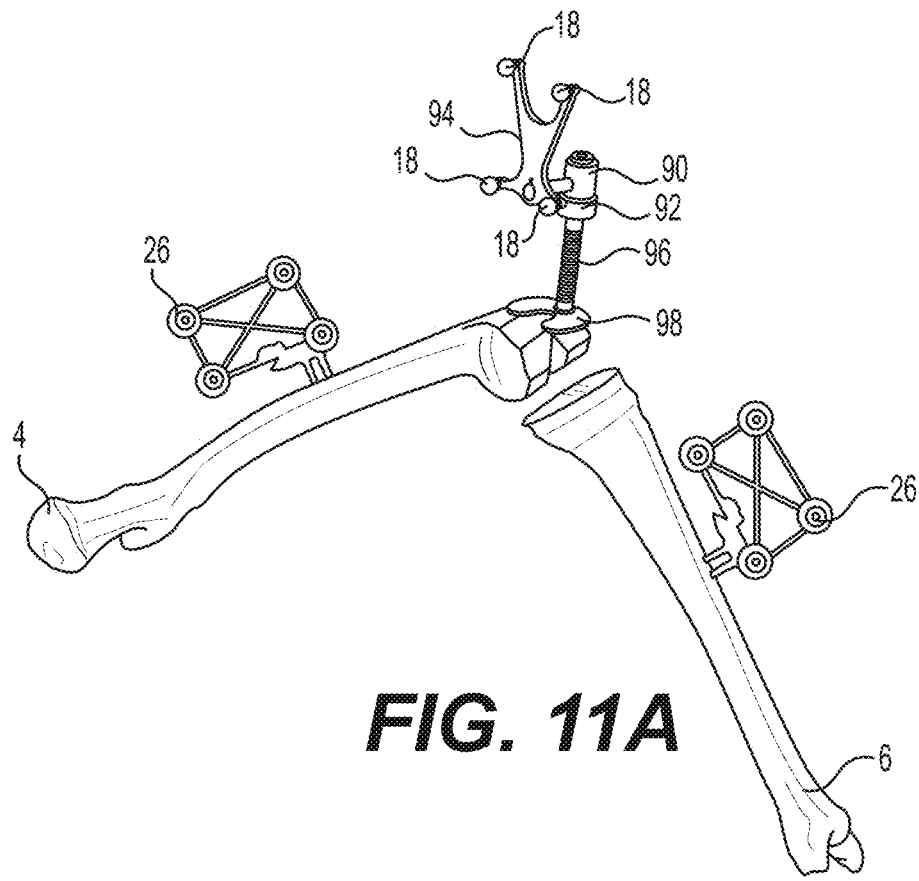
FIGS. 11A-11B show an embodiment of a plane checker.
Figure 11B:
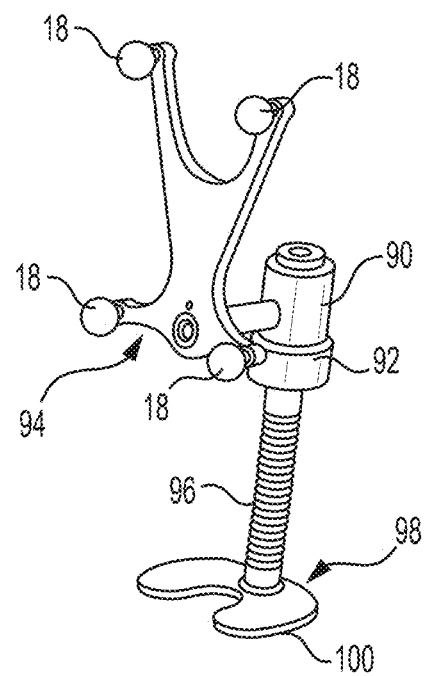

In an alternative embodiment shown in FIGS. 11A-11B, a plane checker instrument 90 may be used to maintain navigational integrity even if traditional anatomical landmarks are removed during the procedure. The plane checker 90 may include a body 92 with a reference element or array 94 including a plurality of tracking markers 18, a shaft 96 extending from the body 92, and a foot 98 at the distal end of the shaft 96. The array 94 is located in a known location relative to the foot 98. The foot 98 may include a U-shaped plate or other suitably shaped plate with a flat bottom surface 100. When used during a TKA procedure, the plane checker 90 may be used to ensure that the angulation and/or location of the resection plans matches the plane. As shown in FIG. 11A, after resection of the femur 4 and/or tibia 6, the foot 98 includes a flat surface 100 which can be placed on the resection planes, and returns to the system 10 an angulation and cut depth. Using this information, the user is able to localize their position and maintain navigation integrity even after the traditional anatomical landmarks have been resected.

Figure 12A:
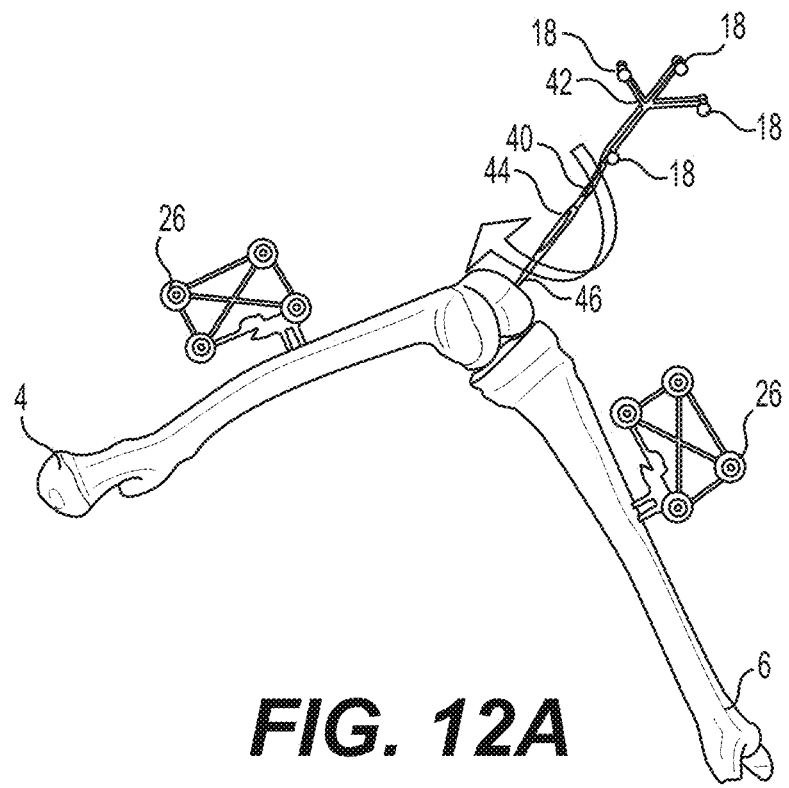
FIGS. 12A-12B illustrate embodiments of the stylus that allow for landmark and/or point capture without the need for depressing the foot pedal of the robot during the operation.
Figure 12B:
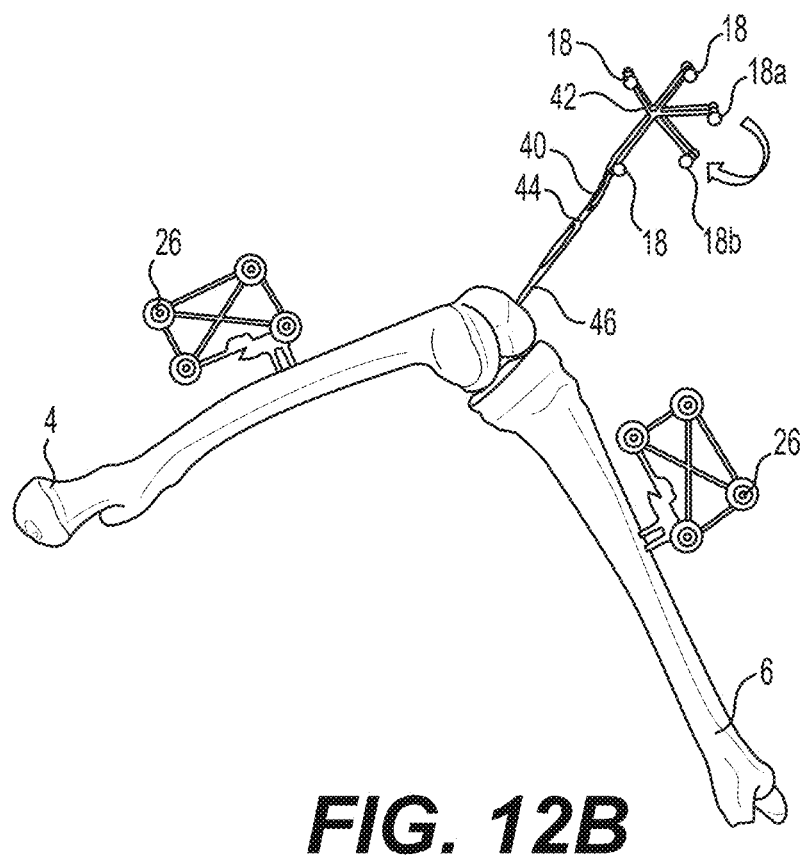

Turning now to FIGS. 12A-12B, embodiments of stylus 40 is shown. In navigated and robotic TKA, the surgeon may need to capture anatomical landmarks or points in order to register the patient anatomy to the system 10, establish and maintain confidence in the system's navigational integrity, and/or localize trials and implants to compare planned to placed accuracy. FIG. 1 shows one setup for navigated and/or robotic TKA. Dynamic reference bases 26 are attached to the femur 4 and tibia 6, and after being registered, the system 10 is able to track the location of each bone in 3D space. The navigated stylus 40 may be used for landmark localization and/or point acquisition. In one workflow, the stylus tip 46 is located at the point of interest and a foot pedal on the robot 12 is pressed to capture the point on the system 10. In this embodiment, the point capture depends on the surgeon pressing the foot pedal that is linked to the system 10.

The foot pedal method of point capture may be problematic if the foot pedal location on the operating room (OR) floor is unknown. For example, the foot pedal may be unintentionally kicked or moved out of reach of the surgeon. If this happens, the surgeon may need to change their focus from the operative field to search for the foot pedal. In addition, cables linking the foot pedal may be problematic, for example, as a trip hazard or obstructing free passage of equipment in the OR. Also, software may need to handle disabling other functionality, such as robot control, that may also be linked to the foot pedal before enabling point capture functionality, which adds complexity to the software algorithms. Accordingly, it may be desirable to include additional embodiments that could be used in place of the traditional foot pedal.

FIG. 12A shows an alternative setup for navigated and/or robotic TKA. FIG. 12A shows a similar setup to FIG. 1 except in this setup, once the point of interest has been localized by the stylus tip 46, the surgeon may rotate the stylus 40 about its long vertical axis by a threshold rotation. By rotating the stylus 40, the markers 18 move from a first position (prior to rotation) to a second position (after rotation). The stylus 40 may rotate about its axis by a threshold rotation of, for example, about 30°, about 60°, about 180°, or any suitable degree to indicate rotation. This rotation is captured by the system 10, and the point of interest is returned, thereby capturing the landmark by the system 10 without depressing the foot pedal or other button. To ensure that the system 10 behaves as intended while the surgeon is identifying points versus moving the tool freely, the system 10 may use algorithmic rules to filter out false positives. For example, the system may check that the threshold rotation (e.g., at least 30° of rotation) occurs while the tip 46 moves less than a given amount (e.g., less than 0.5 mm). For example, if greater than 0.5 mm movement occurs at the tip 46 during the 30° rotation, then disregard the point capture. If less than 0.5 mm movement occurs at the tip 46 during 30° rotation, then capture the point/landmark.

FIG. 12B shows another embodiment for navigated and/or robotic TKA. FIG. 12B shows a similar setup to FIG. 12A except in this embodiment, one tracking marker 18 associated with the array 42 is physically movable once the stylus 40 is on the point of interest or landmark. For example, one tracking marker 18 may be moved from a first tracking marker position 18a to a second tracking marker position 18b. The surgeon may manually move the marker 18 by pressing it with their thumb or finger while holding the stylus tip 46 steady in place. The system 10 detects the movement of one array marker 18a, 18b relative to the others and captures the point of interest.

In yet further embodiments, the process may include point capture via a voice input from the user; point capture via blocking or revealing a tracking marker, or blocking then revealing one or more markers with a specific timing (e.g., equivalent of "double clicking"); point capture via gesture with the other hand, the face, or the elbow, captured and interpreted by visible light tracking; point capture by syncing stylus positioning with a metronome, such that at each beat, a new point is captured, which may be valuable if an articulation of a bone is being systematically digitized; or any other suitable point capture methods or techniques.

Figure 13:
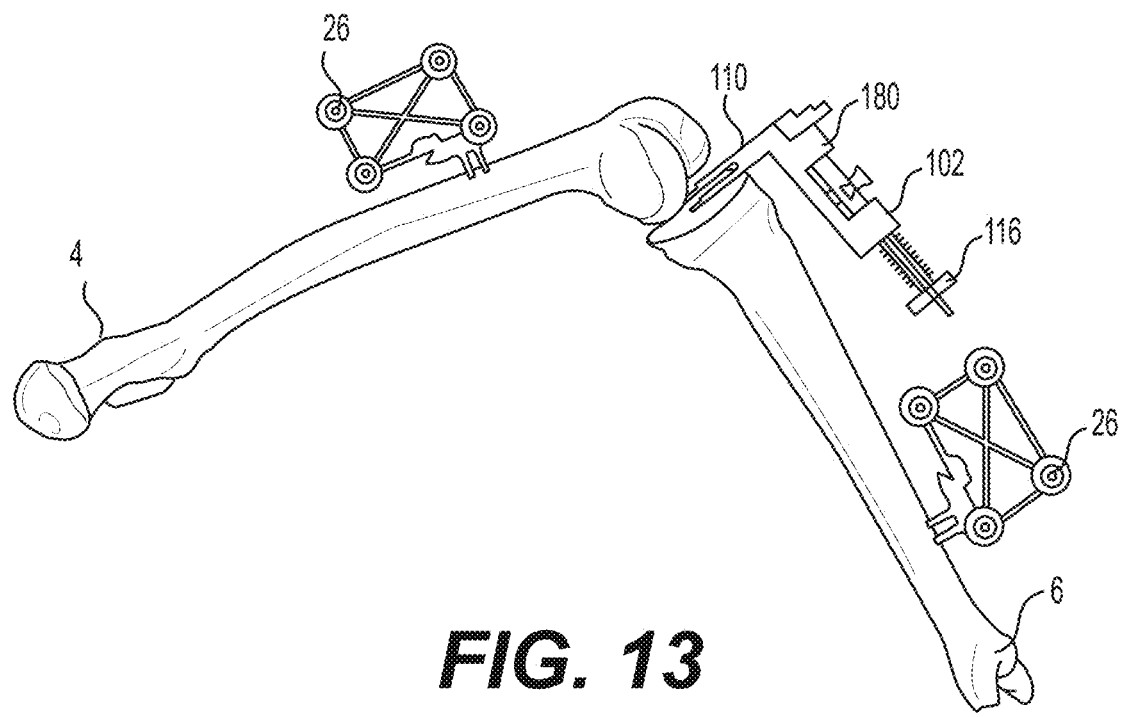
FIG. 13 illustrates an embodiment of a tensor instrument for use during flexion of the femur and tibia.

Turning now to FIG. 13, a tensor instrument or tensor 102 is shown with the femur 4 and tibia 6 in flexion. A goal of total knee arthroplasty (TKA) may be to obtain tensionally symmetric and balanced flexion and extension gaps. One method of achieving this is to use a gap balancing technique in which the femoral cuts (posterior femur 4 in flexion, distal femur 4 in extension) are performed parallel to the resected proximal tibia 6 with each collateral ligament equally tensioned to obtain rectangular flexion and extension gaps. The implants may follow this parallel placement, thereby maintaining tension once implantation is complete.

In robotic and/or navigated TKA, the patient's anatomy is registered to the computational system 10. After registration, the relative location of the patient's tibia 6 and femur 4 may be tracked allowing for real time updates on the computational system 10 of the patient's gap measurements. With the assistance of the tensor 102, the surgeon may view quantified ligament balancing on the navigation display 20. The tensor 102 may facilitate gap balancing by: (1) applying a distraction force between the tibia 6 and femur 4; and/or (2) applying the distraction force such that differing tension in the medial collateral ligament (MCL) and lateral collateral ligament (LCL) is transparent to the user.

Figure 15:
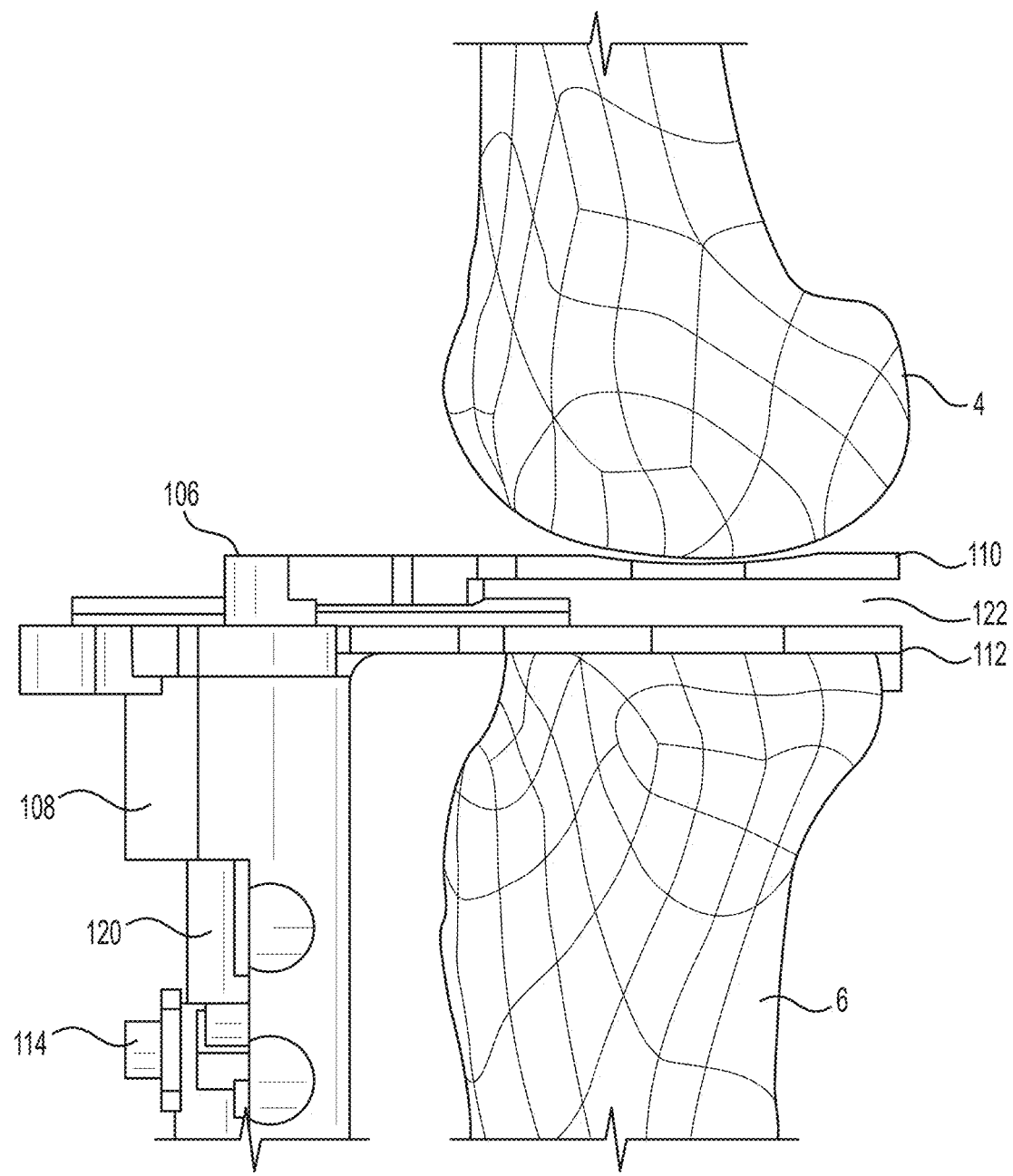
FIG. 15 illustrates the tensor for use during extension of the femur and tibia.

As shown in FIG. 13, dynamic reference bases 26 are rigidly attached to the patient's tibia 6 and femur 4. During registration, the patient's anatomy is registered to the system 10 and tracked via the dynamic reference bases 26. Once the patient is registered, the surgeon may make a first resection. Post resection, the tensor 102 may be used to assess the gap balance. In the embodiment shown in FIG. 13, the proximal tibia 6 is resected and the tensor 102 is placed against the resection while the bones are held in flexion. In FIG. 15, the proximal tibia 6 is resected and the tensor 102 is placed against the resection while the bones are held in extension. It will be appreciated that the resections may be made following a femur first or tibia first approach.

Figure 14:
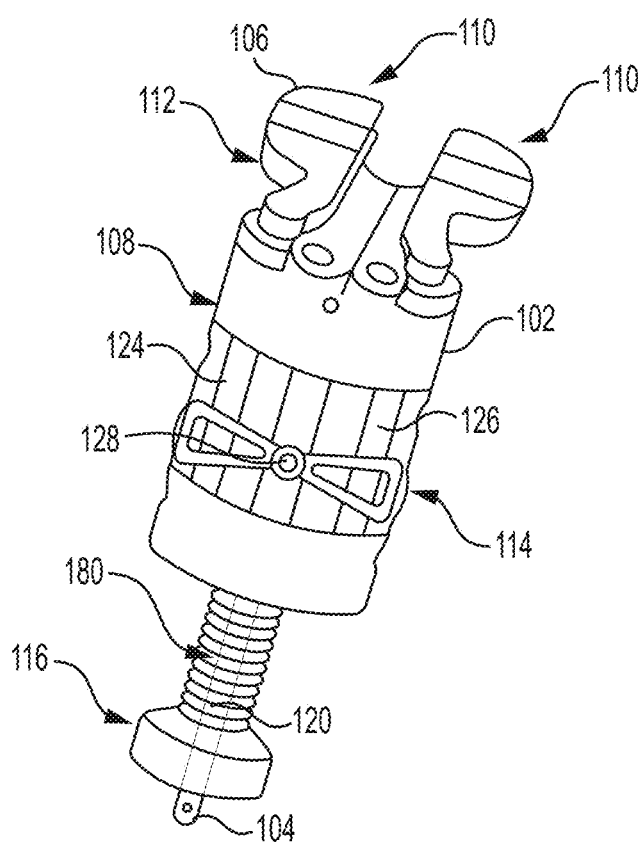
FIG. 14 shows an embodiment of the tensor instrument.

With reference to FIG. 14, the tensor 102 may extend from a proximal end 104 to a distal end 106. The tensor 102 include a body 108 with a pair of independent superior distraction paddles 110 and an inferior distraction paddle 112 at the distal end 106, a central shaft 120 extending along the length of the body 108 configured to move the superior distraction paddles 110 relative to the inferior distraction paddle 112, a knob 116 at the proximal end 104 configured to move the superior distraction paddles 110, and a distraction balancing spring 118 positioned around the shaft 120 between the body 108 and the knob 104.

The tensor 102 is configured to provide a distraction force between the tibia 6 and femur 4. The tensor 102 may allow for any imbalance between MCL and LCL tensions to be displayed by a ligament balance indicator 114 positioned on the body 108 of the tensor 102. The first superior distraction paddle 110 may be connected to a first end of the ligament balance indicator 114 with a first rod 124, and the second superior distraction paddle 110 may be connected to the opposite end of the ligament balance indicator with a second rod 126. The indicator 114 may be pivotably connected to the body 108 with a pivot pin 128. The distraction force may be provided, for example, by rotation of the distraction knob 116. Rotation of the distraction knob 116 may translate the superior distraction paddles 110 outwardly and away from the inferior distraction paddle 112, thereby providing a gap 122 between the superior and inferior distraction paddles 110, 112. As the tensor 102 applies the distraction force, the bony anatomy will move. This movement may be registered by the navigation system 10 and may be displayed for interpretation by the surgeon. Specifically, the movement of the femur and tibia are continuously captured (e.g., as the tensor 102 is adjusted) by the camera 30 through the DRB 26 tracking markers on both tibia and femur bones and the gap information is automatically determined by the computer 16 based on the 3-dimensional positions of the tracking markers on the DRBs 26, rather than manually viewed on the tensor by the surgeon. The changing gap information may be continuously displayed/updated in the display 20 for interpretation by the surgeon and may also be used by the computer 16 to automatically determine whether the planned cuts of the tibia and/or femur need to be adjusted. In some cases, the computer 16 may modify the planned cuts based on the automatically determined gap information and display the modified cut planes on the display 20 (preferably in a 3-D graphical representation relative to the bones similar to FIG. 15, which the surgeon can then grab with, for example, fingers or mouse and rotate the displayed bones, their spacing and desired cut planes in different directions or angle using all 6 degrees of freedom or at least pitch, yaw and roll) for inspection, approval or modification by the surgeon. The gap data may include the angles and spatial separation between the femur and tibia. The angles and spatial separation data may be 3-dimensional data. Moreover, the graphical user interface of the computer 16 is configured to graphically display on the display 20 both the original cut planes and suggested modified cut planes, preferably in different colors such as red and blue, that are superimposed on top of each other for easy comparison by the surgeon.

Figure 16:
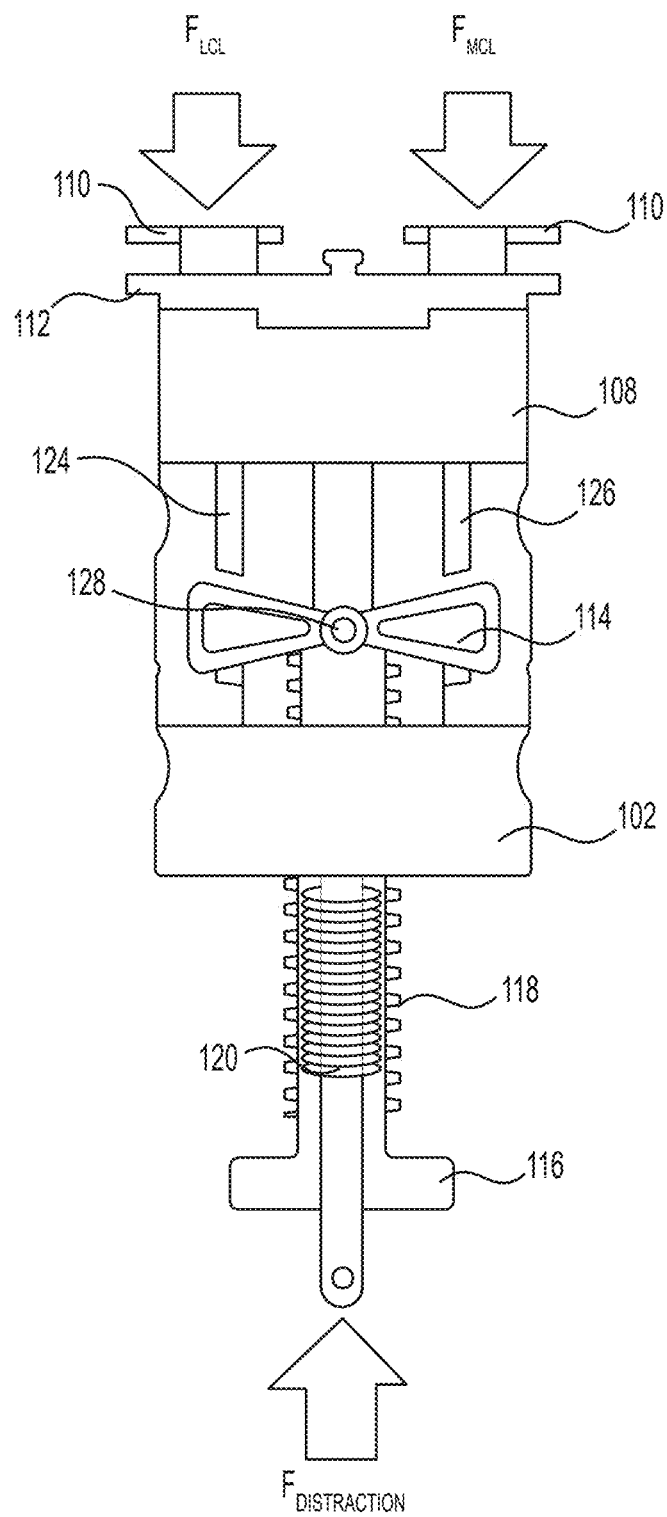
FIG. 16 is an example of the tensor with ligament balance.

With reference to FIG. 16, the distraction paddles 110, 112 of the tensor 102 endure forces when the tensor 102 is inserted and distracted between the femur 4 and tibia 6. For example, a distraction force FDISTRACTION presses against the inferior distraction paddle 112, a force FLCL is applied to the first superior distraction paddle 110, and a force FMCL is applied to the second superior distraction paddle 110. If the ligaments are in balance (FLCL=FMCL), as shown in FIG. 16, the ligament balance indicator 114 may indicate the balance. For example, the ligament balance indicator 114 may be shown generally horizontal. If the ligaments are not in balance (FLCL<FMCL, FLCL>FMCL), then the ligament balance indicator 114 may indicate the imbalance. For example, the ligament balance indicator 114 may be shown generally inclined. The lower side of the indicator 114 may indicate a greater amount of force on the respective superior distraction paddle 110. The indicator 114 may indicate the amount or degree of imbalance for each respective force.

According to one embodiment, a work flow for using the tensor 102 may include one or more of the following: (1) insert dynamic reference bases 26 in bone and register patient; (2) make a first resection (proximal tibia 6 or distal femur 4); (3) check ligament balance with tensor 102 in extension; (4) adjust implant plan accordingly; (5) make remaining resections; (6) check balance in flexion and extension; (7) adjust cuts if required; (8) insert femur trial and check balance in flexion and extension; (9) adjust tibia plan if required; and (10) complete procedure per standard practice. In this manner, the tensor 102 may facilitate gap balancing. By applying a distraction force between the tibia 6 and femur 4, the information may be displayed on the navigation screen 20 for interpretation by the user. In addition, the distraction force may be applied such that differing tension in the MCL and LCL is apparent to the user on the tensor 102.

Figure 17:
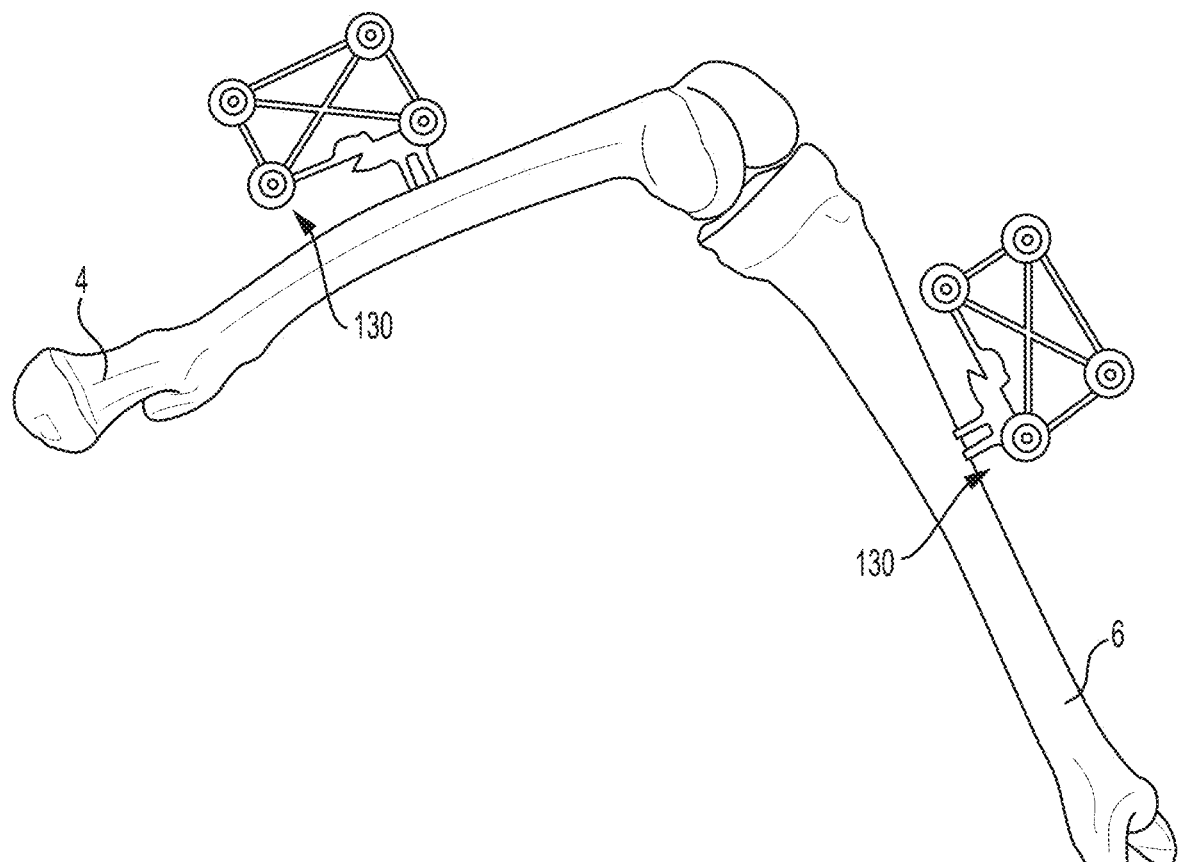
FIG. 17 is an illustration of a femur and tibia with a dynamic reference base attached to each bone.

Turning now to FIG. 17, an embodiment of a modular dynamic reference base 130 is described in further detail. In robotic and/or navigated TKA the patient's anatomy is registered to the system 10. The registration is facilitated by attaching one or more dynamic reference bases 130 to the bone. For example, a first dynamic reference base 130 may be rigidly attached to the femur 4 and a second dynamic reference base 130 may be rigidly attached to the tibia 6. Once registration is complete, the dynamic reference base(s) 130 enable tracking of the patient anatomy in real time.

Figure 18A:
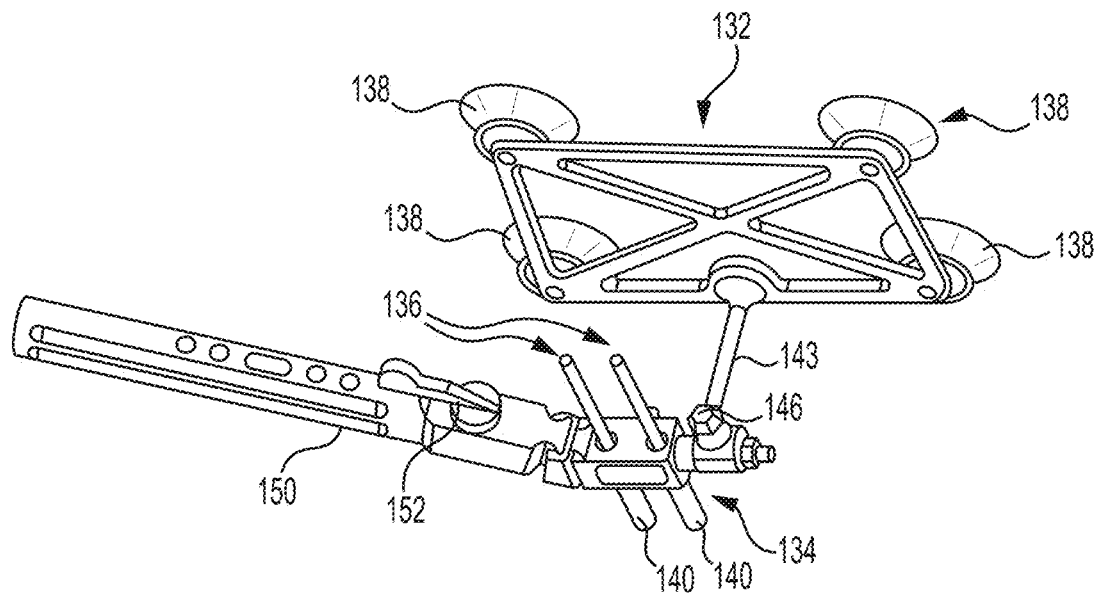
FIGS. 18A-18B show an embodiment of a modular dynamic reference base with a removeable handle for installing the dynamic reference base.
Figure 18B:
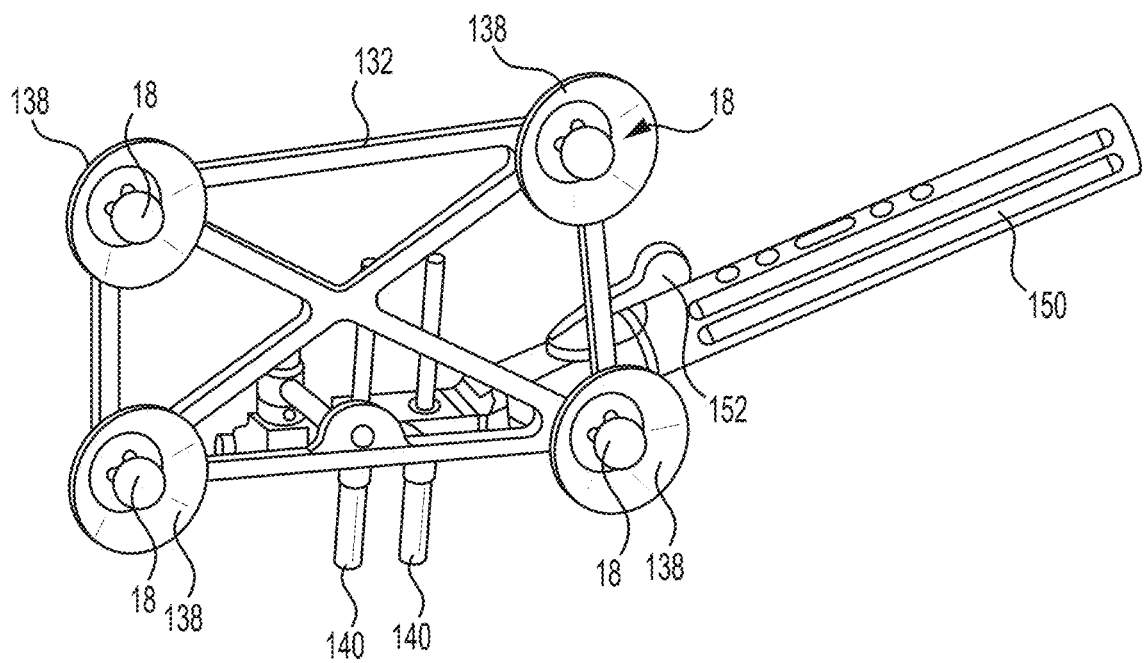

Turning now to FIGS. 18A-18B, the dynamic reference base 130 may be modular, which may reduce the number of instruments used throughout the procedure. The modular dynamic reference base 130 may include a reference element or array 132 including a plurality of tracking markers 18, a bridge 134, and one or more fasteners or bone pins 136 for securing the dynamic reference base 130 to bone. The array 132 may include a rectangular frame with a cross brace. It will be appreciated, however, that the array 132 may include a suitable framework for supporting the tracking markers 18 in a desired configuration. In the embodiment shown, a tracking marker 18 is placed at each corner of the rectangular frame.

The tracking markers 18 may be protected from contamination via one or more physical barriers, protectors, or shields 138 configured to prevent loss of navigation intraoperatively. For example, each of the four tracking markers 18 may be positioned within a respective shield 138. The shields 138 may provide for protection for each of the individual tracking markers 18. The shield 138 may include a round shallow plate with a sloped side. It will be appreciated that the shield 138 may have any suitable configuration for protecting the tracking markers 18. In particular, the tracking markers 18 may be protected from contamination via the shields 138.

The dynamic reference base 130 may include an integrated bridge 134 and pin guide 140. The bridge 134 may include one or more through openings 142 and one or more pin guides 140 configured to receive bone pins 136. The pin guides 140 may include elongate channels configured to guide the bone pins 136 into bone. In the embodiment shown, the bridge 134 may include a first opening 142 aligned and in fluid communication with a first pin guide 140 and a second opening 142 aligned with and in fluid communication with a second pin guide 140. For example, the openings 142 and pin guides 140 may be generally aligned in parallel. It will be appreciated that any suitable number, location, and orientation of openings 142 and pin guides 140 may be selected to effectively attach the bridge 134 to bone. The dynamic reference base 130 may be attached to the patient via the bone pins 136. The bone pins 136 may include self-drilling bone pins. The bridge 134 may be locked to the pins 136 with a first locking screw 144. The integrated bridge 134 and pin guides 140 may reduce the number of instruments required and simplifying the workflow of the procedure.

The dynamic reference base 130 may be attached to the patient with the bone pins 136 and bridge 134. Subsequently, the array 132 may be attached to the bridge 134, for example, with one or more legs 143. The dynamic reference base 130 may include a plurality of legs 143 offered in different lengths for intra and extra incision, which may increase workflow flexibility by facilitating extra and intra incision placement of the construct. The leg 143 may be affixed to the frame of the array 132 and attached to a distal end of the bridge 134. For example, as shown in FIG. 20A, the leg 143 may be positioned through an opening 141 in the bridge 134. As best seen in FIG. 20B, the leg 143 and attached array 132 may be configured to rotate about one or more axes. For example, the leg 143 and attached array 132 may be able to rotate about a longitudinal axis A1 of the bridge 134 and/or an axis A2 perpendicular to the bridge 134. Thus, the bridge 134 may facilitate adjustment about two axes A1, A2. As shown in FIG. 20C, after adjustment along the one or more axes, the array 132 may be locked into position with one or more locking screws 146.

Figure 21:
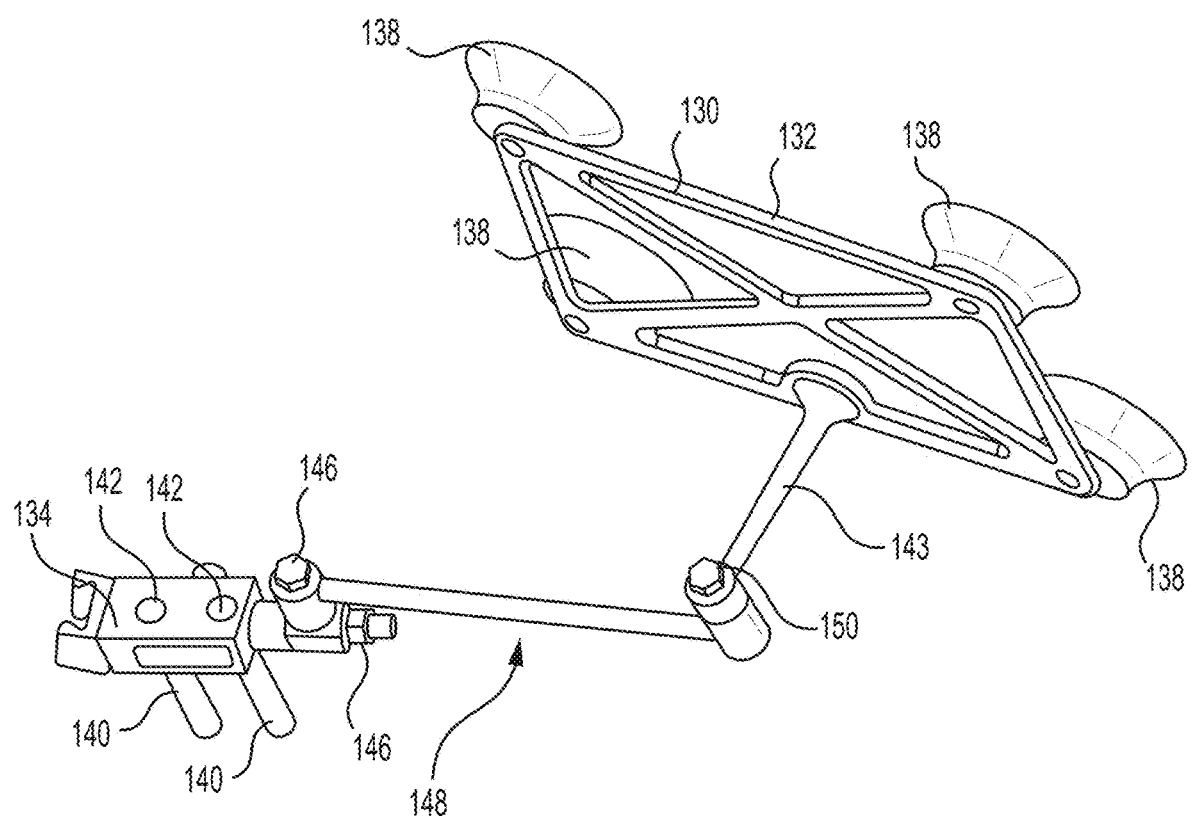
FIG. 21 shows an embodiment of the dynamic reference base with an extension arm between the bridge and the reference array.

As shown in FIG. 21, an optional extension arm or extension 148 may be provided to increase positioning options for the reference element 132. For example, a first end of the extension 148 may connect to the leg 143 at an additional pivot point 150 and a second end of the extension 148 may connect to the bridge 134. The locking screw 146 may secure the extension 148 in position. The extension 148 may increase positioning options for the reference element 132, thereby increasing workflow flexibility.

In order to install the modular dynamic reference base 130, a handle 150 may be attached to the bridge 134. The handle 150 may temporarily connect, for example, to the proximal end of the bridge 134. The handle 150 may include a thumb lock 152, for example, to ensure rigid fixation between the handle 150 and the bridge 134 during use. After the bridge 134 and bone pins 136 are installed, the handle 150 may be removed from the assembly.

Figure 19A:
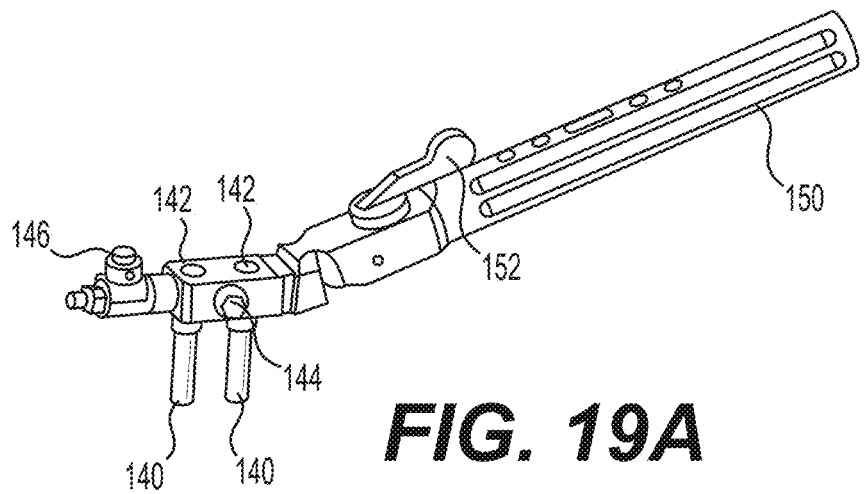
FIGS. 19A-19C depict inserting an integrated bridge and pin guide of the dynamic reference base with the attached handle, driving pins through the bridge and pin guide, and locking the pins to the bridge with a locking element.
Figure 19B:
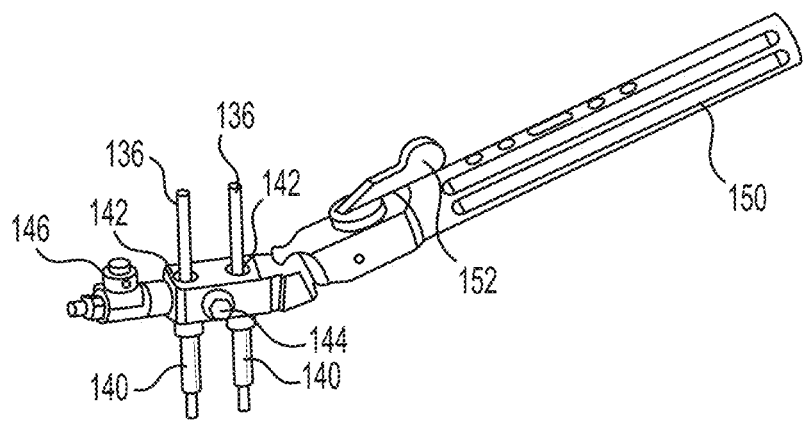
Figure 19C:
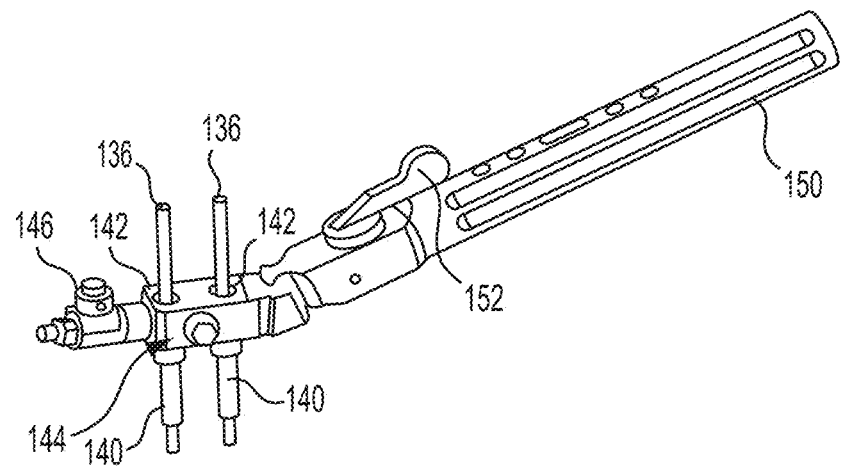

A work flow for installing the modular dynamic reference base 130 may include one or more of the following: (1) make skin incisions on patient; (2) attach the handle 150 to the bridge 134 (shown in FIG. 19A); (3) insert the bridge 134 until it contacts cortical bone; (4) drive the bone pins 136 through the bridge 134 (shown in FIG. 19B); (5) lock the bridge 134 to the pins 136 using the locking screw 144 (shown in FIG. 19C); (6) remove the handle 150; (7) attach the reference element 132 to the bridge 134 (shown in FIG. 20A); (8) adjust the orientation of the reference element 132 (shown in FIG. 20B); (9) lock the adjustment via the locking screw 146 (shown in FIG. 20C); and (10) optionally, attach the extension 148 between the reference element 132 and the bridge 134 to facilitate more positioning options for the reference element 132 (shown in FIG. 21).

Figure 22A:
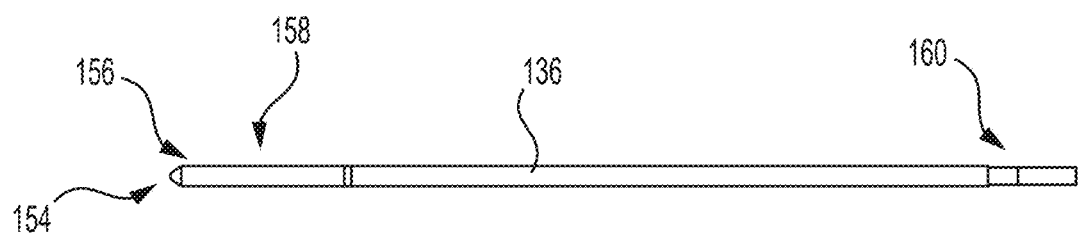
FIGS. 22A-22B show an embodiment of the bone pin which may be used to fixate the dynamic reference base to the bone.
Figure 22B:
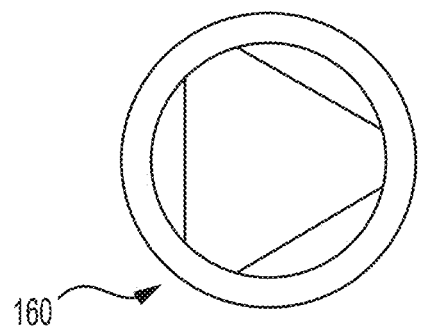

Turning now to FIGS. 22A-22B, an embodiment of a bone pin 136 is shown. The bone pin 136 may be used to fixate the dynamic reference base 130 to bone. The bone pin 136 may include a self-drilling tip 154, chip extraction flutes 156, and bone threads 158. The bone threads 158 may extend along a portion of the pin 136 and may have any suitable attributes including handedness, thread angle, lead, pitch, etc. The pins 136 may include a pin driver interface 160. The pin driver interface 160 may include an engagement surface configured to interface with a driver instrument to thereby install the pin 136. For example, the driver interface 160 may be configured to transfer axial insertion force and torque to the pin 136 to facilitate the pin 136 being driven into the patient anatomy.

Figure 23A:
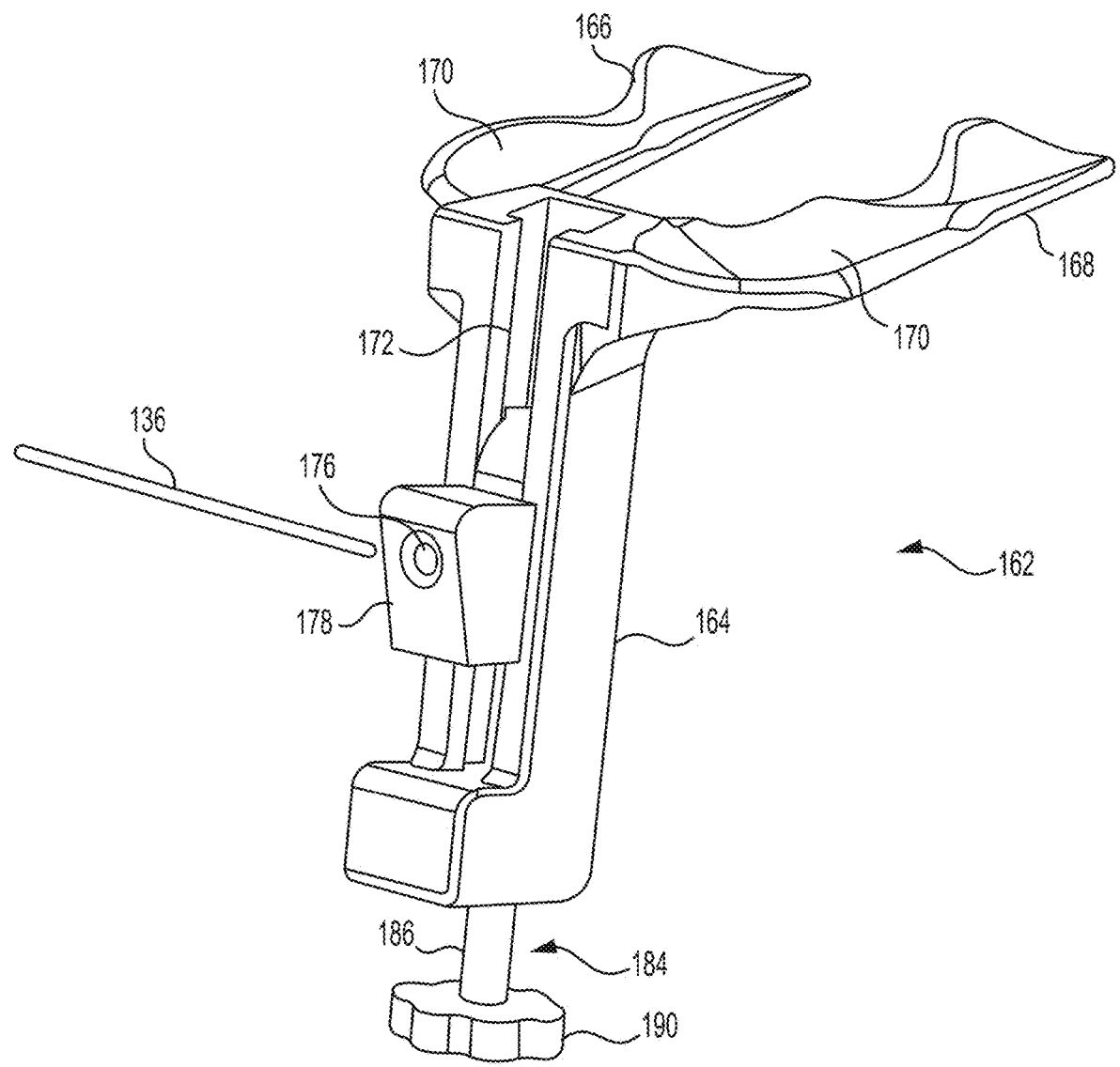
FIG. 23A is a front perspective view of a range-of-motion tensor according to another aspect of the present invention.
Figure 23B:
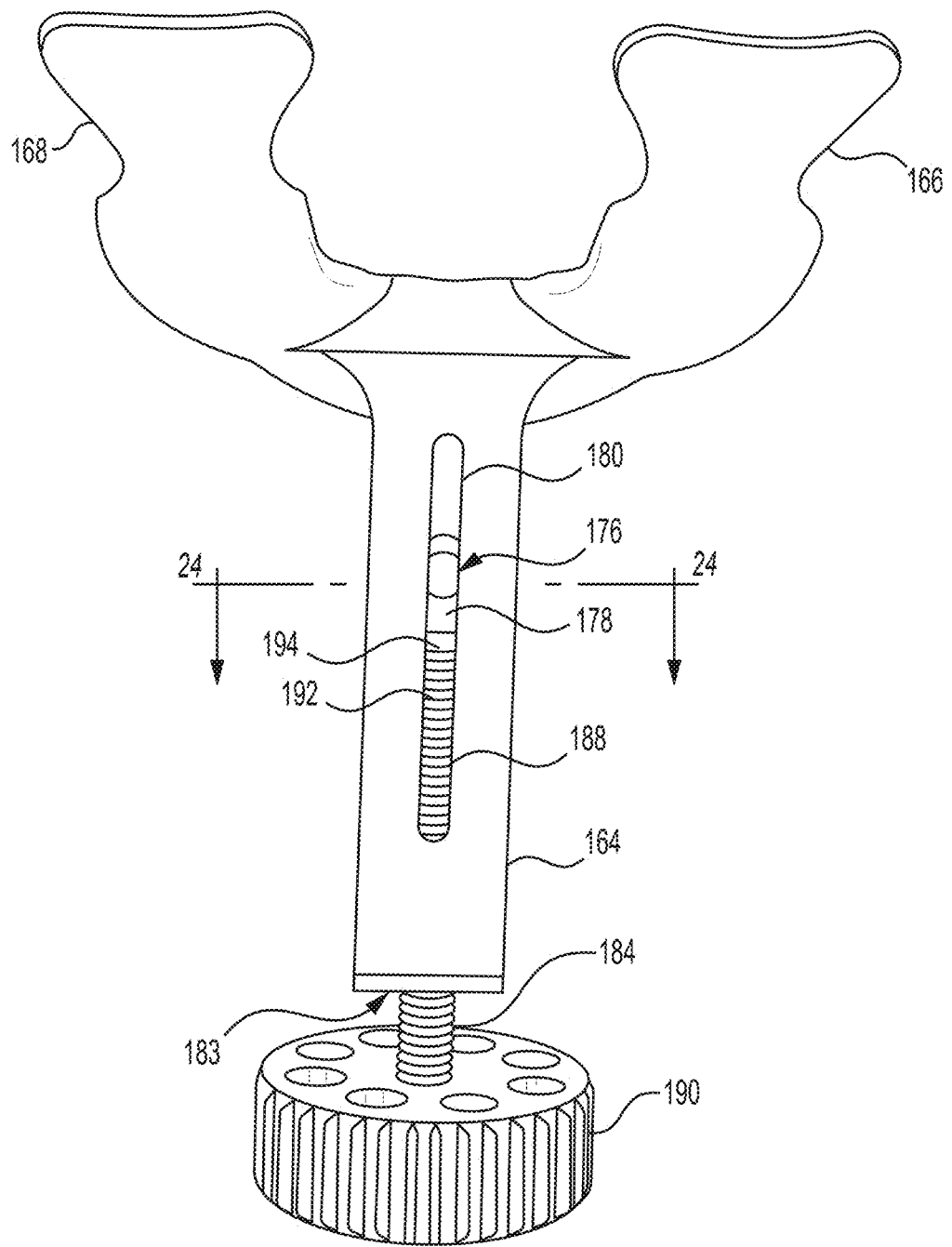
FIG. 23B is a rear view of the tensor of FIG. 23A.
Figure 24:
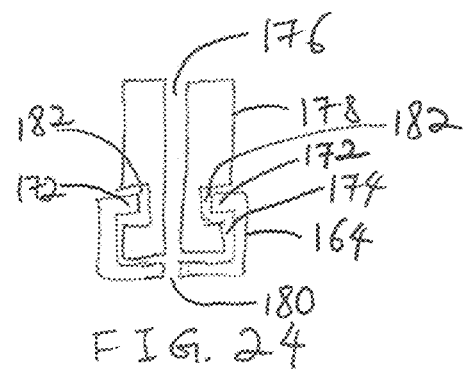
FIG. 24 is a cross sectional view taken along line 24-24 of FIG. 23B.
Figure 25:
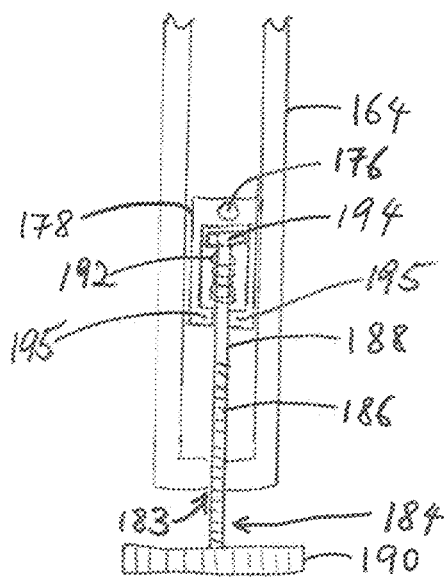
FIG. 25 is a cut away view of the tensor of FIG. 23A to show details of the pin guide and translational adjustment of same.
Figure 26:
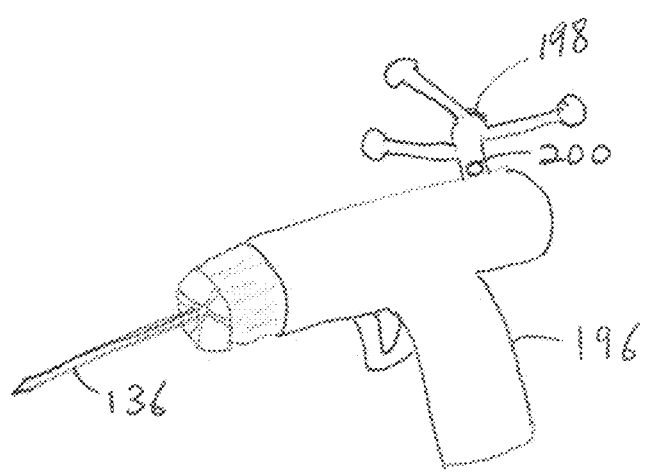
FIG. 26 shows a perspective view of a navigated drill for inserting a pin.

FIGS. 23A-B illustrate a range-of-motion tensor according another aspect of the present invention. The ROM tensor 162 includes an elongate main body 164, and first arm 166 and second arm 168 extending laterally and rearwardly from the main body near its upper portion and configured to be placed between an uncut tibia and uncut femur. A front side of the main body 164 includes an elongate guide 172 that define an internal chamber 174 running the length of the main body. A rear side of the main body 164 includes an elongate slot 180 for passing a pin therethrough.

The arms 166, 168 are positioned at greater than 90 degrees and at between 95 and 105 degrees relative to a longitudinal axis defined by the elongate guides 172 of the main body 164. As shown, the angle between the arms 166,168 and the main body is approximately 110 degrees. Unlike other conventional tensors, the arms 166,168 of the ROM tensor 162 are rigidly and permanently attached to the main body 164. In the embodiment shown, the arms 166, 168 and the main body 164 of the ROM tensor 162 are made of a single integrally formed metal piece.

An upper surface 170 of both arms 166,168 have concave surfaces which are shaped to receive medial and lateral femoral condyles.

The ROM tensor 162 includes a pin guide 178 which is slidably disposed in the elongate guide 172 and has a through-hole 176. The through-hole is at an angle to the main body and is generally parallel to the arms 166,168. Thus, the through-hole 176 is at greater than 90 degrees and at an angle between 95 and 105 degrees relative to the longitudinal axis of the elongate guides 172 and as shown is approximately 110 degrees.

The guide 172 as shown in FIG. 23 includes a pair of opposing rails that slidably receive a corresponding pair of elongate recesses 182. The through-hole 176 is sized to accept a pin such as the pin 136 which goes through the through-hole 176 and the elongate slot 180 and is inserted into the tibia so as to allow the ROM tensor 162 to pivot about the pin as the femur is moved along its range of motion relative to the femur, which is preferably fixed.

The ROM tensor 162 further includes a height adjustment assembly which includes an adjustment shaft 184 having a threaded portion 186 and an unthreaded portion 188 extending from the threaded portion, an adjustment knob 190 attached to a bottom end of the shaft 184, and a spring 192 disposed around the unthreaded portion 188 of the shaft 184. The spring 192 is retained on the shaft 184 by a spring stop 194 at the upper end of the shaft 184, which has a larger diameter than the spring. The spring 192 is held in the pin guide 178 by a lower stop 195 at the bottom of the pin guide 178, which has a smaller width/diameter than the spring.

The threaded portion 186 of the shaft 184 is threadingly received in a threaded hole 183 at the bottom of the main body 164 such that rotation of the knob 190 vertically translates the pin guide 178 along the elongate guide 172 relative to the main body 164.

The spring 192 biases the main body 164 upwardly relative to the pin guide 178 to ensure that the medial and lateral femoral condyles maintain contact with the corresponding upper surfaces 170 of both arms 166,168.

The ROM tensor 162 is similar to the tensor 14 of FIG. 14. However, the arms 166, 168 of the ROM tensor 162 are rigidly fixed to the main body 164. Advantageously, the ROM tensor 162 is designed to pivot about the inserted pin 136 while the tibia is moved rather than moving both the tibia and femur.

According to one aspect, a work flow for using the ROM tensor 162 may include one or more of the following steps: 1) access joint; 2) register anatomy of patient; 3) register drill having a tracker array; 4) Insert ROM Tensor; 5) move tibia through Range-of-Motion; and 6) virtually plan implant placement to fill the gap. The software for the steps performed reside in a computer processing system in the computer platform within the base 16. The processing system includes a processor in communication with the camera 30 and display 20 and a ligament balancing software modules (executed by the proccessor) that monitor all of the DRBs 20,26, markers 18, 198, display gap information on the display, and determine and display suggested cuts and implant positions, which can be modified by the user on the display.

Step (1) involves making an incision (para-patellar), moving the patella to one side, removing meniscus, ACL and fat pads as necessary. Step (2) involves registering a patient medical image in the imaging space (e.g., x-ray or MRI imaging space) to the physical environment in the camera space through the DRBs 26 on the tibia and femur, which are tracked by the camera 30. Step (3) involves registering a drill 196 which has its own DRB 198. One way to register the drill 196 may be to place a verification probe tip at a verification recess/divot point 200. Since the verification probe is registered and the divot point 200 is at a known location on the DRB 198 and its location is fixed relative to a distal end of the pin 136, the system 10 can register or verify a 3D position of the drill 196 in the camera space based on tracking of the DRB 198 and a separate tracking array attached to the probe.

Step (4) involves inserting the arms 166, 168 in the space between the tibia and femur with the leg in full extension, placing the pin 136, which has been inserted into the drill 196, through the through-hole 176 of the pin guide 178, through the slot 180 and into the tibia. The pin 136 is then drilled into the tibia. In one embodiment, the pin 136 is inserted into a slightly medial side of a tubercle of the tibia. During insertion of the arms 166,168, both the tibia and femur are uncut.

Since the drill 196 is a tracked drill, the system may be able to display an ideal trajectory and location of the entry point by displaying a suggested trajectory line on the display 20 and continuously updating an actual trajectory of the pin as superimposed on the display 20. When the two trajectories match, the system 10 may display an indicator, (e.g., a green circle around a proximal end of the pin 136) on the display 20 that the ideal trajectory of the pin 136 has been achieved.

Once the pin 136 has been inserted into the tibia, it is removed from the drill 196. The knob 190 is used to adjust the height of the arms 166, 168 until they are pressing against the bottom of the medial and lateral femoral condyles.

The ROM tensor 162 pushes on the inserted pin 136 to create tension on the collateral ligaments. The tibia will symmetrically balance about the pin 136.

Step (5) involves moving the tibia through its range-of-motion (e.g., 0 to 100 degrees and back) while the femur remain stationary and while the navigation system 10 is monitoring the DRBs 26 on the tibia and femur and determining the gaps between the tibia and femur both on the medial and lateral femoral condyles sides. The system 10 then collects data points and shows a visual graph that shows the gaps between the tibia and femur both on the medial and lateral femoral condyles sides along the angular displacement of the ROM.

Allowing the tibia to symmetrically balance in flexion helps avoid undue rotation of the femur in flexion which can lead to mal-rotation of the femoral implant (i.e., cutting too much lateral distal condyle).

Step (6) involves the system 10 analyzing the gap data and provide either a suggested implant position and/or the cutting planes of the implant. Alternatively, the system 10 allows a physician to interactively plan the implant positioning by continuously updating the display 20 as the physician manipulates the displayed implant on the display 20. Moreover, the graphical user interface of the computer 16 is configured to graphically display on the display 20 both the original cut planes and suggested modified cut planes, preferably in different colors such as red and blue, that are superimposed on top of each other for easy comparison by the physician.

The advantages of the ROM tensor 162 are many. First, no bone cuts are needed to perform this tensioning. Second, rotation of bones to balance soft tissues is shared between the femur and the tibia. In extension, the tibia is free to swivel medial or lateral to balance the ligament loads. In flexion, the rotation of the femur and tibia share the balancing loads.

Flexed femoral tension is biased by the loose lateral ligament, and can lead to mal-rotation errors of the femur. By moving the pivot action to the tibial side, this rotation is more easily controlled. The tibia is only connected to the femur and allows a more freely pivoting action as opposed to the femur which is connected to the pelvis and tibia.

Also, deformity of the medial posterior femur will not bias the rotation of the femur since the condyle feet of the tensor do not pivot. This in-turn helps better share the balancing between the femur and the tibia which will help avoid moving the "joint line" proximal during tensor balancing.

It will be further understood that various changes in the details, materials, and arrangements of the parts which have been described and illustrated in order to explain the nature of this invention may be made by those skilled in the art without departing from the scope of the invention as expressed in the claims. One skilled in the art will appreciate that the embodiments discussed above are non-limiting. It will also be appreciated that one or more features of one embodiment may be partially or fully incorporated into one or more other embodiments described herein.

What is claimed is:

1. A system for ligament balancing comprising:
a main body having an elongate guide extending along a vertical longitudinal axis;
first and second arms rigidly attached to and extending laterally from the main body along a lateral axis which is lateral to the vertical longitudinal axis, and configured to be placed over an uncut tibia and below a femur, the first and second arms each having a concave upper surface shaped to receive a respective medial and lateral condyles of the femur;
a pin guide slidably coupled to the elongate guide and having a through-hole extending therethough, the pin guide adapted to slide up and down along the vertical longitudinal axis; and
a pin adapted to be inserted into the tibia through the pin guide through-hole so as to allow the main body to pivot about the inserted pin as the tibia moves relative to the femur through a range of motion.

2. The system of claim 1, wherein:
the elongate guide includes a pair of elongate tracks; and
the pin guide has corresponding elongate grooves that receive the elongate tracks.

3. The system of claim 1, further comprising a threaded shaft coupled to the pin guide for adjustably positioning the pin guide within the elongate guide of the main body.

4. The system of claim 3, wherein:
the main body body includes a threaded bore; and
the threaded bore threadably receives the threaded shaft.

5. The system of claim 4, further comprising a knob attached to a bottom of the threaded shaft such that rotation of the knob slides the pin guide within the elongate guide.

6. The system of claim 3, further comprising a spring disposed on the threaded shaft to bias the pin guide downwardly.

7. The system of claim 1, wherein the main body and the first and second arms are integrally formed as a single unitary piece.

8. The system of claim 1, further comprising a navigation system including:
first and tracking arrays adapted to be respectively attached to the femur and tibia; and
a tracking device configured to track the pose of the first and second tracking arrays;
a processor adapted to record the pose of the first and second tracking arrays as the tibia is moved in a range of motion while the femur remains stationary.

9. The system of claim 8, wherein the processor is adapted to display in a display device a visual graph showing the recorded poses.

10. The system of claim 8, wherein the processor is adapted to recommend a cutting plan that minimizes a gap between the tibia and femur.

11. A system for ligament balancing comprising:
a main body having an elongate guide extending along a vertical longitudinal axis;
first and second arms rigidly attached to and extending laterally from the main body along a lateral axis which is lateral to the vertical longitudinal axis, and configured to be placed over an uncut tibia and below a femur, the first and second arms each having a concave upper surface shaped to receive a respective medial and lateral condyles of the femur;
a pin guide slidably coupled to the elongate guide and having a through-hole extending therethough, the pin guide adapted to slide up and down along the vertical longitudinal axis; and
a pin adapted to be inserted into the tibia through the pin guide through-hole so as to allow the main body to pivot about the inserted pin as the tibia moves relative to the femur through a range of motion;
a navigation system including: first and tracking arrays adapted to be respectively attached to the femur and tibia;
a camera tracking device configured to track the pose of the first and second tracking arrays as the tibia is moved along its range of motion;
a display device; and
a processor coupled to the display device and adapted to record the pose of the first and second tracking arrays tracked by the camera tracking device as the tibia is moved and display on the display device gap data.

12. The system of claim 11, wherein:
the elongate guide includes a pair of elongate tracks; and
the pin guide has corresponding elongate grooves that receive the elongate tracks.

13. The system of claim 11, further comprising a threaded shaft coupled to the pin guide for adjustably positioning the pin guide within the elongate guide of the main body.

14. The system of claim 13, wherein:
the main body body includes a threaded bore; and
the threaded bore threadably receives the threaded shaft.

15. The system of claim 14, further comprising a knob attached to a bottom of the threaded shaft such that rotation of the knob slides the pin guide within the elongate guide.

16. The system of claim 13, further comprising a spring disposed on the threaded shaft to bias the pin guide downwardly.

17. The system of claim 11, wherein the main body and the first and second arms are integrally formed as a single unitary piece.

18. The system of claim 11, further comprising a navigated drill having a third tracking array and adapted to receive the pin, wherein the processor is configured to display a trajectory of the pin based on tracking of the third tracking array by the camera tracking device.

19. The system of claim 18, wherein the drill includes a verification point for receiving a tip of a probe for registering or verifying a 3D position of the drill.

20. The system of claim 11, wherein the processor is adapted to display in a display device a visual graph showing the recorded poses.

* * * * *